US012689580B2

(12) United States Patent
Shirakawa et al.

(10) Patent No.: US 12,689,580 B2
(45) Date of Patent: Jul. 21, 2026

(54) ACCESS POINT APPARATUS, STATION APPARATUS, AND RADIO COMMUNICATION SYSTEM

(71) Applicant: SHARP KABUSHIKI KAISHA, Sakai City (JP)

(72) Inventors: Atsushi Shirakawa, Sakai City (JP); Ryota Yamada, Sakai City (JP); Takuhiro Sato, Sakai City (JP); Hideo Namba, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 416 days.

(21) Appl. No.: 18/119,637

(22) Filed: Mar. 9, 2023

(65) Prior Publication Data

US 2024/0129226 A1    Apr. 18, 2024

(30) Foreign Application Priority Data

Oct. 14, 2022    (JP) ................................. 2022-165193

(51) Int. Cl.
| | |
|---|---|
| *H04L 45/24* | (2022.01) |
| *H04L 69/323* | (2022.01) |
| *H04W 28/08* | (2023.01) |
| *H04W 84/12* | (2009.01) |

(52) U.S. Cl.
CPC ......... *H04L 45/24* (2013.01); *H04W 28/0908* (2020.05); *H04L 69/323* (2013.01); *H04W 84/12* (2013.01)

(58) Field of Classification Search
CPC ..... H04W 48/08; H04W 76/11; H04W 76/15; H04W 16/02; H04W 84/12
See application file for complete search history.

(56) References Cited

U.S. PATENT DOCUMENTS

| | | | |
|---|---|---|---|
| 2021/0051513 A1 | 2/2021 | Min et al. | |
| 2021/0298102 A1* | 9/2021 | Kwon ................... | H04W 48/08 |
| 2021/0321410 A1* | 10/2021 | Patil ...................... | H04W 72/27 |
| 2022/0264429 A1* | 8/2022 | Gan ................. | H04W 28/0221 |
| 2024/0114573 A1* | 4/2024 | Ko ........................ | H04W 76/15 |

OTHER PUBLICATIONS

Rui Cao et al., "Aggregated PPDU for Large BW", doc.: IEEE 802.11-20/0693r1, Date:May 2, 2020.
Po-Kai Huang et al., "Multi-link Operation Framework", doc.: IEEE 802.11-19/0773r8, Date:Jul. 1, 2019.
Pooya Monajemi et al., "Dynamic Link Sets for MLDs", doc.: IEEE 802.11-20/0810r1, Date:May 15, 2020.
Minyoung Park, "LB266 Comment Resolution Multi-link Traffic Indication Part1", doc.: IEEE 802.11-22/1381r5doc.: IEEE, Date: Aug. 24, 2022.

* cited by examiner

*Primary Examiner* — Mahran Y Abu Roumi
(74) *Attorney, Agent, or Firm* — ScienBiziP, P.C.

(57) ABSTRACT

A Multi-Link access point apparatus uses multiple combinations of link offset information and information of the number of links to notify, by using only a small amount of information, whether a frame is buffered that is addressed to a Multi-Link station apparatus operating in a Power Management mode and information of a link, the use of which is indicated or recommended.

9 Claims, 17 Drawing Sheets

| IEEE 802.11a/b/g | L-STF | L-LTF | L-SIG | Data | | | | |
|---|---|---|---|---|---|---|---|---|

| IEEE 802.11n | L-STF | L-LTF | L-SIG | HT-SIG | HT-STF | HT-LTF | Data | |

| IEEE 802.11ac | L-STF | L-LTF | L-SIG | VHT-SIG-A | VHT-STF | VHT-LTF | VHT-SIG-B | Data |

| IEEE 802.11ax | L-STF | L-LTF | L-SIG | RL-SIG | HE-SIG-A | HE-STF | HE-LTF | HE-SIG-B | Data |

| IEEE 802.11be | L-STF | L-LTF | L-SIG | RL-SIG | U-SIG | EHT-SIG | EHT-STF | EHT-LTF | Data |

| Element ID | Length | DTIM Count | DTIM Period | Bitmap Control | 1 | 0 | 0 | 1 | 0 | 0 | 1 | 0 | 0 | 0 | 0 | 0 | 0 | 0 | 0 |
|---|---|---|---|---|---|---|---|---|---|---|---|---|---|---|---|---|---|---|---|
| | | | | | | | | | | | | Partial Virtual Bitmap | | | | | | | |

FIG. 11

AID Bitmap Element

Multi-link Traffic Indication Element

AID Bitmap Element

17~11

Multi-link Traffic Indication Element

Link2

17-12

Link3

17-13

Link4

17-14

ACCESS POINT APPARATUS, STATION APPARATUS, AND RADIO COMMUNICATION SYSTEM

TECHNICAL FIELD

The present disclosure relates to an access point apparatus, a station apparatus, and a radio communication system.

BACKGROUND ART

The Institute of Electrical and Electronics Engineers Inc. (IEEE) has been continuously working on updating of the IEEE 802.11 specification that is a wireless Local Area Network (LAN) standard in order to achieve an increase in speed and frequency efficiency of the wireless LAN network. In a wireless LAN, it is possible to perform radio communication using unlicensed bands that can be used without being allowed (licensed) by nations or regions. For applications for individuals, such as for domestic use, Internet accesses from inside residences has been wirelessly established by, for example, including wireless LAN access point functions in line termination apparatuses for connection to a Wide Area Network (WAN) line such as the Internet or connecting wireless LAN access point apparatuses to line termination apparatuses. In other words, wireless LAN station apparatuses such as smartphones and PCs can associate to wireless LAN access point apparatuses and access the Internet.

The specification of IEEE 802.11ax is expected to be formulated in 2020, and communication apparatuses such as wireless LAN devices compliant with the specification draft and smartphones and Personal Computers (PCs) equipped with the wireless LAN devices have already appeared on the market as products that are compliant with Wi-Fi 6 (trade name; a name for IEEE 802.11ax compliant products certified by the Wi-Fi Alliance). Also, activities for standardizing IEEE 802.11be as a standard subsequent to IEEE 802.11ax has been started in recent days. With the rapid distribution of wireless LAN devices, further improvement in throughput per user in environments where wireless LAN devices are densely disposed has been studied in the standardization of IEEE 802.11be.

On the other hand, the European Telecommunications Standards Institute (ETSI) in Europe and the Federal Communications Commission (FCC) in the United States have been conducting studies to allow the 6 GHz band (5.935 to 7.125 GHz) to be used as an unlicensed band, and similar studies are also under way in other countries in the world. This means that wireless LANs are expected to be able to use the 6 GHz band in addition to the 2.4 GHz band and 5 GHz. In order to cope with the expansion of target frequencies, the Wi-Fi Alliance has formulated Wi-Fi 6E (trade name), which is an extended version of Wi-Fi 6 and which uses the 6 GHz band.

To be precise, the 6 GHz band includes frequencies of 5.935 to 7.125 GHz, and this means that a total of approximately 1.2 GHz can be newly used as the bandwidth. This corresponds to an increase by 14 channels in terms of 80 MHz width channels and to an increase by 7 channels in terms of 160 MHz width channels. Abundant frequency resources are expected to be available, and thus, studies have been conducted about extension of the maximum channel bandwidth usable by one wireless LAN communication system (equivalent to a BSS described below) from 160 MHz in IEEE 802.11ax to 320 MHz in IEEE 802.11be, which is twice the channel bandwidth (see NPL 1).

The 2.4 GHz band provides a relatively large coverage (communicable range), while enabling the use of only a relatively narrow bandwidth, leading to a significant effect of interference between communication apparatuses. On the other hand, while the 5 GHz band and the 6 GHz band provide large communication bandwidths, while failing to provide a wide coverage. For those reasons, to implement a variety of service applications on a wireless LAN, frequency bands used (2.4 GHz band, 5 GHz band, 6 GHz band, and the like, or channels included in each frequency band or subchannels included in channels) are desirably bundled or switched for use depending on a use case. However, known wireless LAN communication apparatuses are not allowed to bundle and use different frequency bands (2.4 GHz band, 5 GHz band, 6 GHz band, and the like) used for communication. Switching the frequency bands (2.4 GHz band, 5 GHz band, 6 GHz band, and the like) needs to temporarily disconnect the current frequency band and connect to another frequency band.

Thus, in IEEE 802.11be standardization, Multi-Link Operation (MLO) has been discussed in which a communication apparatus uses multiple frequency bands to enable multiple link connections to be maintained (see NPL 2). As an example of the MLO, three link connections are simultaneously operated, including a 2.4 GHz band connection, a 5 GHz band connection, and a 6 GHz band connection. Of course, the combination of frequency bands, channels, or sub-channels is not limited to the above-described one and various combinations are available. In terms of the frequency band, millimeter waves (45 GHz band, 60 GHz band, or the like) may also be used in the future as one link constituting the Multi-Link. The MLO allows a communication apparatus to maintain multiple link connections with different configurations related to wireless resources and communication used by the communication apparatus. In other words, the use of the MLO allows the communication apparatus to simultaneously maintain link connections of different frequency bands. This enables not only frame transmission and/or reception by simultaneous use of multiple links but also switching of the link connection for frame transmission and/or reception (change of the frequency band) without performing a reconnection operation. Note that the link constituting multiple links (multi-link, Multi-Link) is also referred to as a physical layer link.

CITATION LIST

Non Patent Literature

NPL 1: IEEE 802.11-20/0693-01-00be, May 2020
NPL 2: IEEE 802.11-19/0773-08-00be, Nov. 2019
NPL 3: IEEE 802.11-20/0810-01-00be, Jul. 2020
NPL 4: IEEE 802.11-22/1381-01-00be, Aug. 2022

SUMMARY

Technical Problem

A Multi-Link Device (MLD) station apparatus performing the Multi-Link Operation (MLO) discontinuously receives a management frame such as a beacon for power saving in a case of operating in a Power Management mode (a Power Save mode or a sleep mode). The MLD station apparatus checks the content of the received management frame, and detects and determines whether an MLD access point apparatus corresponding to a connection destination buffers a frame addressed to the MLD station apparatus. In response to detecting that the MLD access point apparatus corresponding to the connection destination buffers a frame addressed to the MLD station apparatus, the MLD station apparatus transitions to an active mode in which frame transmission and/or reception is enabled and receives the buffered frame.

To transmit the buffered frame (accumulated frame or pending frame for transmission) addressed to each MLD station apparatus, the MLD access point apparatus is desired to notify which link (physical layer link) is to be used or recommended. NPL 4 discloses one technique, but a problem with the technique is poor efficiency for notification such as the use of a large number of information bits for notification.

Solution to Problem

To solve the aforementioned problems, an access point apparatus, a station apparatus, and a radio communication system according to the present disclosure is as follows.

(1) Specifically, an access point apparatus according to an aspect of the present disclosure is an access point apparatus for communicating with multiple station apparatuses, the access point apparatus including: transmitters and receivers configured to communicate with the multiple station apparatuses by using multiple physical layer links, the transmitters and the receivers corresponding to respective ones of the multiple physical layer links, wherein any of the transmitters transmits, to the multiple station apparatuses, a management frame including AID bitmap information and multi-link traffic indication information, the multi-link traffic indication information includes first information and second information, the first information includes multiple pieces of link offset information, each of the multiple pieces of link offset information includes an offset value corresponding to a traffic indication bitmap associated with each of the multiple pieces of link offset information, the offset value indicates a physical layer link of the multiple physical layer links corresponding to the traffic indication bitmap, the second information includes information of the number of links, the information of the number of links indicates one or multiple of the multiple physical layer links corresponding to the traffic indication bitmap associated with each of the multiple pieces of link offset information, the AID bitmap information includes information indicating that a plurality of the traffic indication bitmaps each are associated with one or multiple of the station apparatuses connected to the access point apparatus, multiple pieces of third information are available, the third information being a combination of the first information and the second information, and the multiple pieces of third information are different from each other in a maximum number of physical layer links to be supported.

(2) In the access point apparatus according to an aspect of the present disclosure, described above in (1), a single piece of the multi-link traffic indication information includes multiple pieces of the third information.

(3) In the access point apparatus according to an aspect of the present disclosure, described above in (1), the management frame includes multiple pieces of the multi-link traffic indication information, and a single piece of the multi-link traffic indication information includes a single piece of the third information.

(4) An access point apparatus according to an aspect of the present disclosure is an access point apparatus for communicating with multiple station apparatuses, the access point apparatus including: transmitters and receivers configured to communicate with the multiple station apparatuses by using multiple physical layer links, the transmitters and the receivers corresponding to respective ones of the multiple physical layer links, wherein any of the transmitters transmits, to the multiple station apparatuses, a management frame including AID bitmap information and multi-link traffic indication information, the multi-link traffic indication information includes link block information and a traffic indication bitmap, the link block information includes a value indicating a combination of physical layer links of the multiple physical layer links corresponding to a plurality of the traffic indication bitmaps associated with respective pieces of the link block information, and the AID bitmap information includes information indicating that each of the plurality of the traffic indication bitmaps is associated with one or multiple of the multiple station apparatuses connected to the access point apparatus.

(5) An access point apparatus according to an aspect of the present disclosure is an access point apparatus for communicating with multiple station apparatuses, the access point apparatus including: transmitters and receivers configured to communicate with the multiple station apparatuses by using multiple physical layer links, the transmitters and the receivers corresponding to respective ones of the multiple physical layer links, wherein any of the transmitters transmits, to the multiple station apparatuses, a management frame including multi-link traffic indication information, the multi-link traffic indication information includes a link bitmap pattern and an AID bitmap, and the AID bitmap indicates a station apparatus of the multiple station apparatuses using the link bitmap pattern.

(6) An access point apparatus according to an aspect of the present disclosure is an access point apparatus for communicating with multiple station apparatuses, the access point apparatus including: transmitters and receivers configured to communicate with the multiple station apparatuses by using multiple physical layer links, the transmitters and the receivers corresponding to respective ones of the multiple physical layer links, wherein any of the transmitters transmits, to the multiple station apparatuses, a management frame including multi-link traffic indication information, the multi-link traffic indication information includes one link number and an AID bitmap, and the AID bitmap indicates a station apparatus of the multiple station apparatuses using the link number.

(7) A station apparatus according to an aspect of the present disclosure is a station apparatus for communicating with an access point apparatus, the station apparatus including: transmitters and receivers configured to communicate by using multiple physical layer links, the transmitters and the receivers corresponding to respective ones of the multiple physical layer links, wherein any of the receivers receives a management frame including AID bitmap information and multi-link traffic indication information for multiple station apparatuses, the multi-link traffic indication information includes first information and second information, the first information includes multiple pieces of link offset information, each of the multiple pieces of link offset information includes an offset value corresponding to a traffic indication bitmap associated with each of the multiple pieces of link offset information, the offset value indicates a physical layer link of the multiple physical layer links corresponding to the traffic indication bitmap, the second information includes information of the number of links, the information of the number of links indicates one or multiple of the multiple physical layer links corresponding to the traffic indication bitmap associated with each of the multiple pieces of link offset information, the AID bitmap information includes information indicating that a plurality of the traffic indication bitmaps each are associated with one or multiple of the multiple station apparatuses connected to the access point apparatus, multiple pieces of third information are available, the third information being a combination of the first information and the second information, and the multiple pieces of third information are different from each other in a maximum number of physical layer links to be supported.

(8) A radio communication system according to an aspect of the present disclosure is a radio communication system including: an access point apparatus; and multiple station apparatuses configured to communicate with the access point apparatus by using multiple physical layer links, wherein the access point apparatus transmits, to the multiple station apparatuses, a management frame including AID bitmap information and multi-link traffic indication information, the multi-link traffic indication information includes first information and second information, the first information includes multiple pieces of link offset information, each of the multiple pieces of link offset information includes an offset value corresponding to a traffic indication bitmap associated with each of the multiple pieces of link offset information, the offset value indicates a physical layer link of the multiple physical layer links corresponding to the traffic indication bitmap, the second information includes information of the number of links, the information of the number of links indicates one or multiple of the multiple physical layer links corresponding to the traffic indication bitmap associated with each of the multiple pieces of link offset information, the AID bitmap information includes information indicating that a plurality of the traffic indication bitmaps each are associated with one or multiple of the multiple station apparatuses connected to the access point apparatus, multiple pieces of third information are available, the third information being a combination of the first information and the second information, and the multiple pieces of third information are different from each other in a maximum number of physical layer links to be supported.

Advantageous Effects

According to the present disclosure, an MLD access point apparatus can efficiently notify an MLD station apparatus operating in a Power Management mode of the presence or absence of a buffered frame (accumulated frame or a pending frame for transmission).

BRIEF DESCRIPTION OF DRAWINGS

FIG. 11 is a diagram illustrating frame transmission and/or reception according to an aspect of the present disclosure.

DESCRIPTION OF EMBODIMENTS

Figure 1:
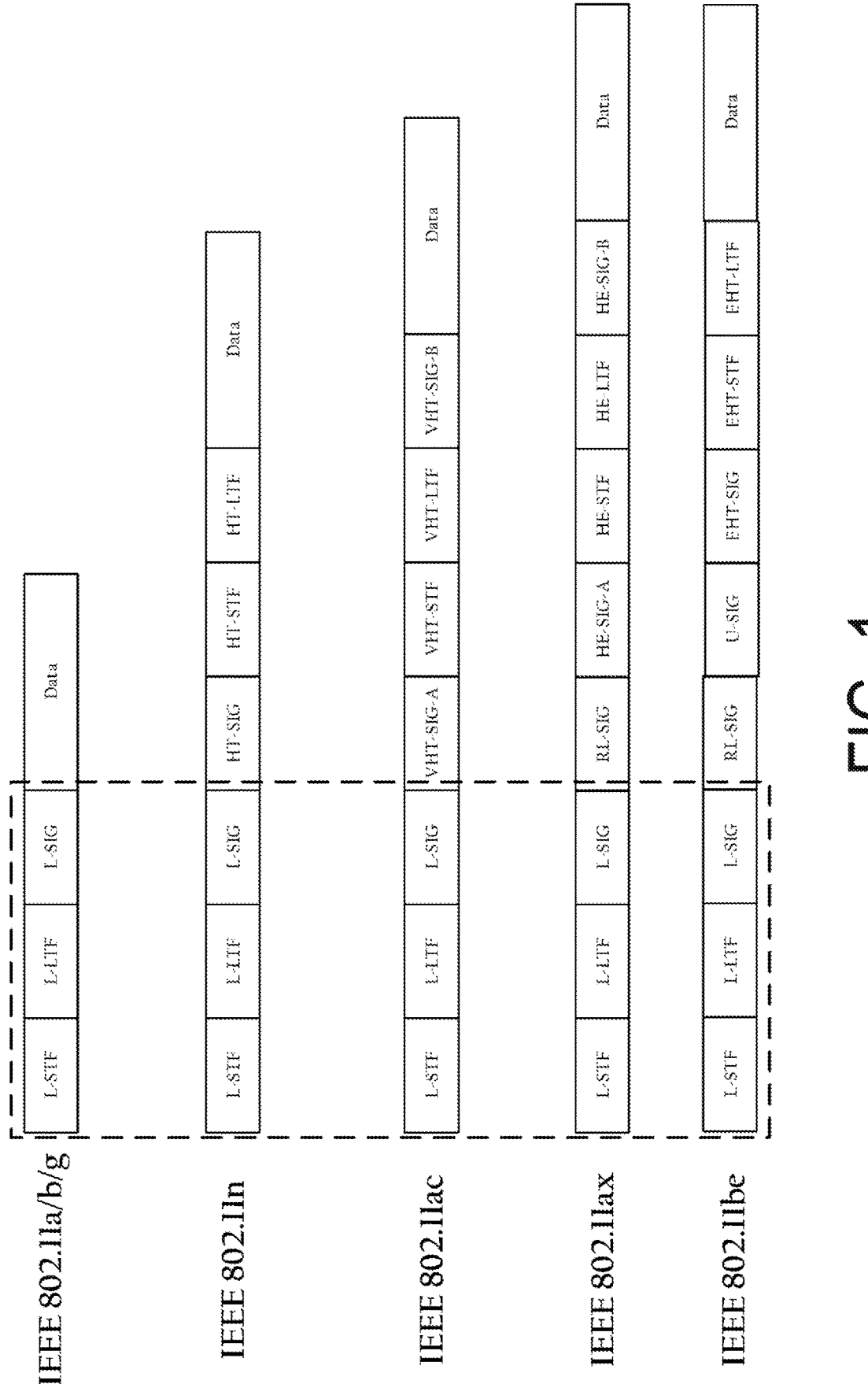
FIG. 1 is a diagram illustrating an example of a frame configuration according to an aspect of the present disclosure.

A communication system according to the present embodiment includes an access point apparatus (or also referred to as a base station apparatus) and a plurality of station apparatuses (or also referred to as a plurality of terminal apparatuses). The communication system and a network including the access point apparatus and the station apparatus will be referred to as a Basic service set (BSS: management range). In addition, the station apparatus according to the present embodiment can have functions of the access point apparatus. Similarly, the access point apparatus according to the present embodiment can have functions of the station apparatus. Therefore, in a case that a communication apparatus is simply mentioned below, the communication apparatus can indicate both the station apparatus and the access point apparatus.

The base station apparatus and the terminal apparatus in the BSS are assumed to perform communication based on Carrier sense multiple access with collision avoidance (CSMA/CA). Although the present embodiment is intended for an infrastructure mode in which a base station apparatus performs communication with multiple terminal apparatuses, the method of the present embodiment can also be performed in an ad hoc mode in which terminal apparatuses perform communication directly with each other. In the ad hoc mode, the terminal apparatuses substitute the base station apparatus to form a BSS. The BSS in the ad hoc mode will also be referred to as an independent basic service set (IBSS). In the following description, a terminal apparatus that forms an IBSS in the ad hoc mode can also be considered to be a base station apparatus. The method of the present embodiment can also be performed in Wi-Fi Direct (trade name) in which terminal apparatuses directly communicate with each other. In Wi-Fi Direct, the terminal apparatuses form a Group instead of the base station apparatus. Hereinafter, the terminal apparatus as a Group owner forming a Group in Wi-Fi Direct can also be regarded as a base station apparatus.

In an IEEE 802.11 system, each apparatus can transmit transmission frames of multiple frame types in a common frame format. Each of transmission frames is defined as a physical (PHY) layer, a medium access control (MAC) layer, and a logical link control (LLC) layer.

A transmission frame of the PHY layer will be referred to as a physical protocol data unit (PPDU, PHY protocol data unit, or physical layer frame). The PPDU includes a physical layer header (PHY header) including header information and the like for performing signal processing in the physical layer, a physical service data unit (PSDU, PHY service data unit, or MAC layer frame) that is a data unit processed in the physical layer, and the like. The PSDU can include an aggregated MAC protocol data unit (MPDU) (A-MPDU) in which multiple MPDUs serving as retransmission units in a wireless section are aggregated.

A PHY header includes a reference signal such as a short training field (STF) used for detection, synchronization, and the like of signals, a long training field (LTF) used for obtaining channel information for demodulating data, and the like and a control signal such as a signal (SIG) including control information for demodulating data. In addition, STFs are classified into a legacy-STF (L-STF), a high throughput-STF (HT-STF), a very high throughput-STF (VHT-STF), a high efficiency-STF (HE-STF), an extremely high throughput-STF (EHT-STF), and the like in accordance with corresponding standards, and LTFs and SIGs are also similarly classified into an L-LTF, an HT-LTF, a VHT-LTF, an HE-LTF, an L-SIG, an HT-SIG, a VHT-SIG, an HE-SIG, and an EHT-SIG depending on the corresponding standards. The VHT-SIG is further classified into VHT-SIG-A1, VHT-SIG-A2, and VHT-SIG-B. Similarly, the HE-SIG is classified into HE-SIG-A1 to 4 and HE-SIG-B. In addition, on the assumption of technology update in the same standard, a universal SIGNAL (U-SIG) field including additional control information can be included.

Furthermore, the PHY header can include information for identifying a BSS of a transmission source of the transmission frame (hereinafter, also referred to as BSS identification information). The information for identifying a BSS can be, for example, a service set identifier (SSID) of the BSS or a MAC address of a base station apparatus of the BSS. In addition, the information for identifying a BSS can be a value unique to the BSS (e.g., a BSS color, etc.) other than an SSID or a MAC address.

The PPDU is modulated in accordance with the corresponding standard. In the IEEE 802.11n standard, for example, the PPDU is modulated into an orthogonal frequency division multiplexing (OFDM) signal.

Figure 8:
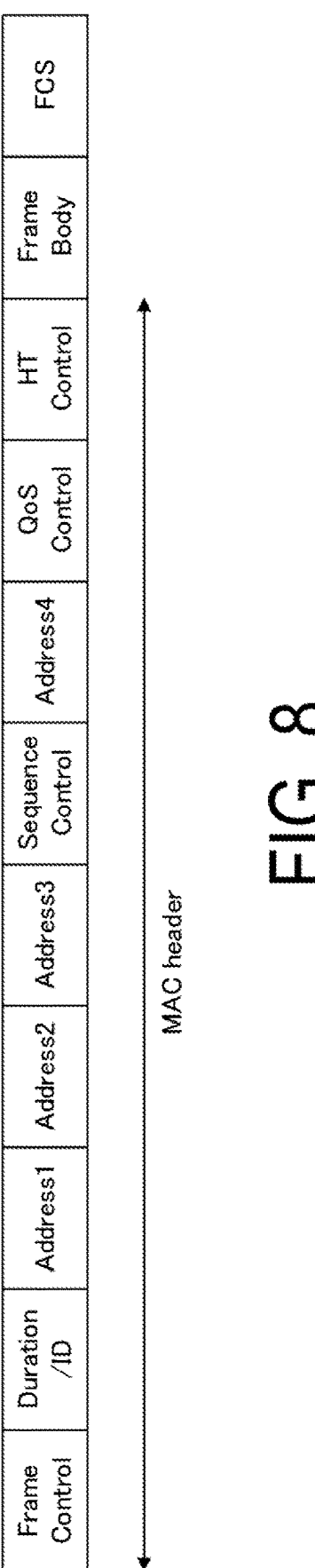
FIG. 8 is a diagram illustrating an example of a frame configuration according to an aspect of the present disclosure.

An MPDU includes a MAC layer header (MAC header) including header information and the like for performing signal processing in the MAC layer, a MAC service data unit (MSDU) or a frame body that is a data unit processed in the MAC layer, and a frame check sequence (FCS) for checking whether there is an error in a frame (FIG. 8). In addition, multiple MSDUs can be aggregated as an Aggregated MSDU (A-MSDU).

Frame types of a transmission frame of the MAC layer are generally classified into three frame types, namely a management frame for managing a connection state and the like between apparatuses, a control frame for managing a communication state between apparatuses, and a data frame including actual transmission data, and each frame type is further classified into multiple types of subframes. The control frame includes a reception completion notification (Acknowledge or Ack) frame, a transmission request (Request to send or RTS) frame, a reception preparation completion (Clear to send or CTS) frame, and the like. The management frame includes a beacon frame, a probe request frame, a probe response frame, an authentication frame, a connection request (Association request) frame, a connection response (Association response) frame, and the like. The data frame includes a data frame, a polling (CF-poll) frame, and the like. Each apparatus can recognize the frame type and the subframe type of a received frame by interpreting contents of the frame control field included in the MAC header.

Further, an Ack may include a Block Ack. A Block Ack can give a reception completion notification with respect to multiple MPDUs.

The beacon frame includes a field in which an interval at which a beacon is transmitted (beacon interval) and an SSID are described. The base station apparatus can periodically broadcast a beacon frame within a BSS, and each terminal apparatus can recognize the base station apparatus in the surroundings of the terminal apparatus by receiving the beacon frame. The action of the terminal apparatus recognizing the base station apparatus based on the beacon frame broadcast from the base station apparatus will be referred to as passive scanning. On the other hand, the action of the terminal apparatus searching for the base station apparatus by broadcasting a probe request frame in the BSS will be referred to as active scanning. The base station apparatus can transmit a probe response frame in response to the probe request frame, and details described in the probe response frame are equivalent to those in the beacon frame.

The terminal apparatus recognizes the base station apparatus and performs a connection process with respect to the base station apparatus. The connection process is classified into an authentication procedure and a connection (association) procedure. The terminal apparatus transmits an authentication frame (authentication request) to the base station apparatus desiring a connection. Once the base station apparatus receives the authentication frame, then the base station apparatus transmits, to the terminal apparatus, an authentication frame (authentication response) including a status code indicating whether authentication can be made for the terminal apparatus. The terminal apparatus can determine whether the terminal apparatus has been authenticated by the base station apparatus by interpreting the status code described in the authentication frame. Further, the base station apparatus and the terminal apparatus can exchange the authentication frame multiple times.

After the authentication procedure, the terminal apparatus transmits a connection request frame to the base station apparatus in order to perform the connection procedure. Once the base station apparatus receives the connection request frame, the base station apparatus determines whether to allow the connection to the terminal apparatus and transmits a connection response frame to notify the terminal apparatus of the intent. In the connection response frame, an association identifier (AID) for identifying the terminal apparatus is described in addition to the status code indicating whether to perform the connection process. The base station apparatus can manage multiple terminal apparatuses by configuring different AIDs for the terminal apparatuses for which the base station apparatus has allowed connection.

After the connection process is performed, the base station apparatus and the terminal apparatus perform actual data transmission. In the IEEE 802.11 system, a distributed coordination function (DCF), a point coordination function (PCF), and mechanisms in which the aforementioned mechanisms are enhanced (an enhanced distributed channel access (EDCA) or a hybrid control mechanism (hybrid coordination function (HCF)), and the like) are defined. A case that the base station apparatus transmits signals to the terminal apparatus using the DCF will be described below as an example.

In the DCF, the base station apparatus and the terminal apparatus perform carrier sensing (CS) for checking usage of a radio channel in the surroundings of the apparatuses prior to communication. For example, in a case that the base station apparatus serving as a transmitting station receives a signal of a higher level than a predefined clear channel assessment level (CCA level) on a radio channel, transmission of transmission frames on the radio channel is postponed. Hereinafter, a state in which a signal of a level that is equal to or higher than the CCA level is detected on the radio channel will be referred to as a busy (Busy) state, and a state in which a signal of a level that is equal to or higher than the CCA level is not detected will be referred to as an idle (Idle) state. In this manner, CS performed based on power of a signal actually received by each apparatus (reception power level) is called physical carrier sense (physical CS). Further, the CCA level is also called a carrier sense level (CS level) or a CCA threshold (CCAT). Further, in a case that a signal of a level that is equal to or higher than the CCA level has been detected, the base station apparatus and the terminal apparatus start to perform an operation of demodulating at least a signal of the PHY layer.

The base station apparatus performs carrier sensing by an inter-frame space (IFS) in accordance with the type of transmission frame to be transmitted and determines whether the radio channel is busy or idle. A period in which the base station apparatus performs carrier sensing varies depending on the frame type and the subframe type of a transmission frame to be transmitted by the base station apparatus. In the IEEE 802.11 system, multiple IFSs with different periods are defined, and there are a short frame interval (Short IFS or SIFS) used for a transmission frame with the highest priority given, a polling frame interval (PCF IFS or PIFS) used for a transmission frame with a relatively high priority, a distribution control frame interval (DCF IFS or DIFS) used for a transmission frame with the lowest priority, and the like. In a case that the base station apparatus transmits a data frame with the DCF, the base station apparatus uses the DIFS.

The base station apparatus waits by DIFS and then further waits for a random backoff time to prevent frame collision. In the IEEE 802.11 system, a random backoff time called a contention window (CW) is used. CSMA/CA works with the assumption that a transmission frame transmitted by a certain transmitting station is received by a receiving station in a state in which there is no interference from other transmitting stations. Therefore, in a case that transmitting stations transmit transmission frames at the same timing, the frames collide against each other, and the receiving station cannot receive them properly. Thus, each transmitting station waits for a randomly configured time before starting transmission, and thus collision of frames can be avoided. In a case that the base station apparatus determines, through carrier sensing, that a radio channel is idle, the base station apparatus starts to count down CW, acquires a transmission right for the first time after CW becomes zero, and can transmit the transmission frame to the terminal apparatus. Further, in a case that the base station apparatus determines through the carrier sensing that the radio channel is busy during the count-down of CW, the base station apparatus stops the count-down of CW. In addition, in a case that the radio channel is idle, then the base station apparatus restarts the count-down of the remaining CW after the previous IFS.

Next, details of frame reception will be described. A terminal apparatus that is a receiving station receives a transmission frame, interprets the PHY header of the transmission frame, and demodulates the received transmission frame. Then, the terminal apparatus interprets the MAC header of the demodulated signal and thus can recognize whether the transmission frame is addressed to the terminal apparatus itself. Further, the terminal apparatus can also determine the destination of the transmission frame based on information described in the PHY header (for example, a group identifier (Group ID or GID) listed in VHT-SIG-A).

In a case that the terminal apparatus determines that the received transmission frame is addressed to the terminal apparatus and has been able to demodulate the transmission frame without any error, the terminal apparatus has to transmit an ACK frame indicating that the frame has been properly received to the base station apparatus that is the transmitting station. The ACK frame is one of transmission frames with the highest priority transmitted only after a wait for the SIFS period (with no random backoff time). The base station apparatus ends the series of communication with the reception of the ACK frame transmitted from the terminal apparatus. Further, in a case that the terminal apparatus is not able to receive the frame properly, the terminal apparatus does not transmit ACK. Thus, in a case that the ACK frame has not been received from the receiving station for a certain period (a length of SIFS+ACK frame) after the transmission of the frame, the base station apparatus assumes that the communication has failed and ends the communication. In this manner, an end of a single communication operation (also called a burst) in the IEEE 802.11 system must be determined based on whether an ACK frame has been received except for special cases such as a case of transmission of a broadcast signal such as a beacon frame, a case that fragmentation for splitting transmission data is used, or the like.

In a case that the terminal apparatus determines that the received transmission frame is not addressed to the terminal apparatus itself, the terminal apparatus configures a network allocation vector (NAV) based on the length of the transmission frame described in the PHY header or the like. The terminal apparatus does not attempt communication during the period configured in the NAV. In other words, because the terminal apparatus performs the same operation as in the case that the terminal apparatus determines the radio channel is busy through physical CS for the period configured in the NAV, the communication control based on the NAV is also called virtual carrier sensing (virtual CS). The NAV is also configured by a request to send (RTS) frame or a clear to send (CTS) frame, which are introduced to solve a hidden terminal problem in addition to the case that the NAV is configured based on the information described in the PHY header.

Unlike the DCF in which each apparatus performs carrier sensing and autonomously acquires the transmission right, with respect to the PCF, a control station called a point coordinator (PC) controls the transmission right of each apparatus within a BSS. In general, the base station apparatus serves as a PC and acquires the transmission right of the terminal apparatus within a BSS.

A communication period using the PCF includes a contention-free period (CFP) and a contention period (CP). Communication is performed based on the aforementioned DCF during a CP, and a PC controls the transmission right during a CFP. The base station apparatus serving as a PC broadcasts a beacon frame with description of a CFP period (CFP max duration) and the like in a BSS prior to communication with a PCF. Further, the PIFS is used for transmission of the beacon frame broadcast at the time of a start of transmission by the PCF, and the beacon frame is transmitted without waiting for CW. Further, the terminal apparatus that has received the beacon frame configures the CFP period described in the beacon frame in a NAV. Hereinafter, the terminal apparatus can acquire the transmission right only in a case that a signal (e.g., a data frame including CF-poll) for broadcasting the acquisition of the transmission right transmitted by the PC is received until the NAV elapses or a signal (e.g., a data frame including CF-end) broadcasting the end of the CFP in the BSS is received. Further, because no packet collision occurs in the same BSS during the CFP period, each terminal apparatus does not take a random backoff time used for the DCF.

Figure 4:
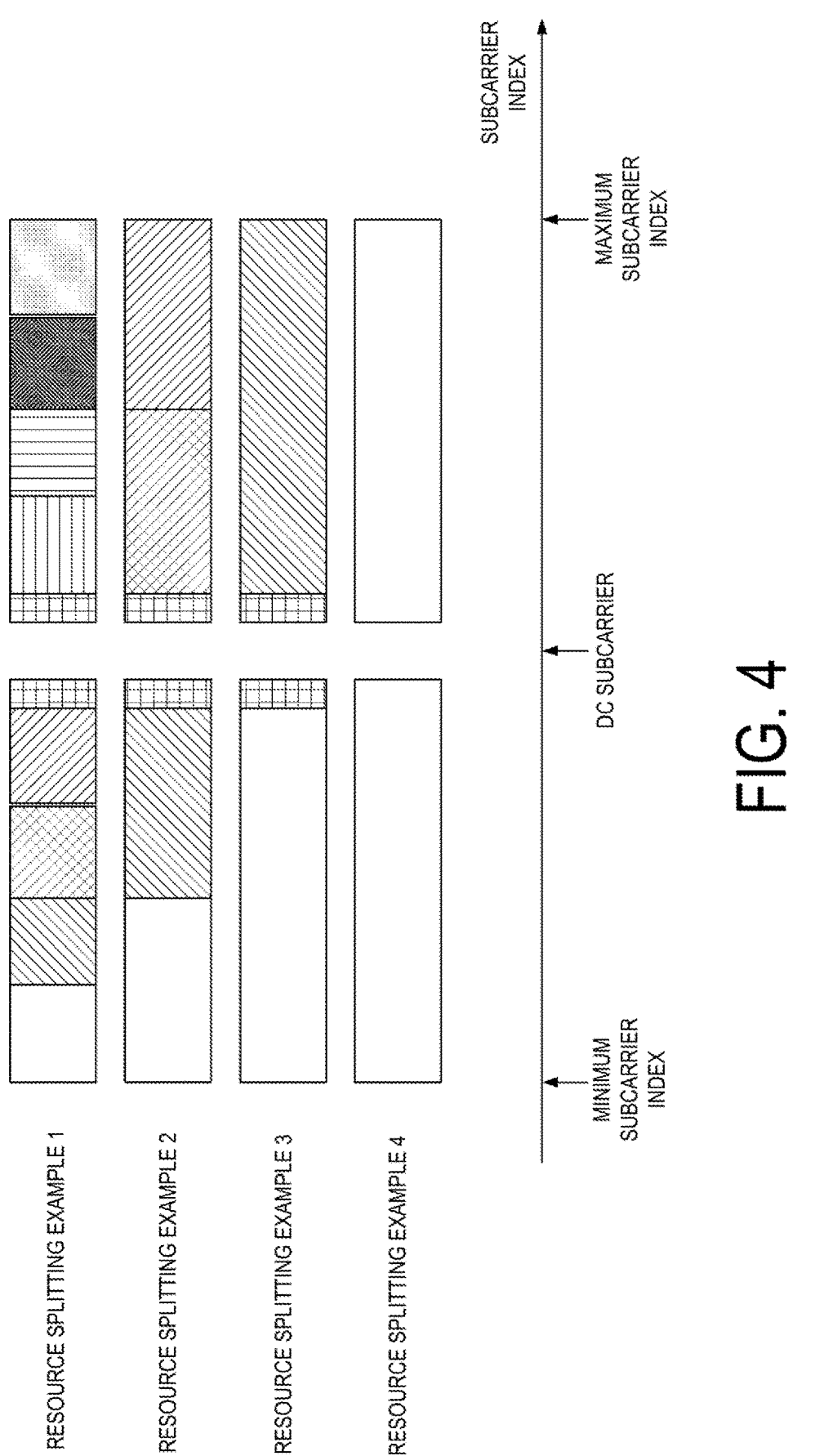
FIG. 4 is an overview diagram illustrating examples of splitting of radio resources according to an aspect of the present disclosure.

A radio medium can be split into multiple resource units (RUs). FIG. 4 is an overview diagram illustrating an example of a split state of a radio medium. In the resource splitting example 1, for example, the radio communication apparatus can split a frequency resource (subcarrier) that is a radio medium into nine RUs. Similarly, in a resource splitting example 2, the radio communication apparatus can split a subcarrier that is a radio medium into five RUs. It is a matter of course that the resource splitting examples illustrated in FIG. 4 are merely examples, and for example, each of multiple RUs can include a different number of subcarriers. Moreover, the radio medium that is split into RUs can include not only a frequency resource but also a spatial resource. The radio communication apparatus (e.g., an AP) can transmit frames to multiple terminal apparatuses (e.g., multiple STAs) at the same time by allocating frames addressed to different terminal apparatuses in each RU. An AP can describe information indicating a split state of the radio medium (resource allocation information) as common control information in the PHY header of the frame transmitted by the AP itself. Moreover, the AP can describe information indicating an RU in which a frame addressed to each STA is allocated (resource unit assignment information) as unique control information in the PHY header of the frame transmitted by the AP itself.

In addition, multiple terminal apparatuses (e.g., multiple STAs) can transmit frames at the same time by allocating and transmitting the frames in the RUs allocated to themselves, respectively. The multiple STAs can perform frame transmission after waiting for a predetermined period after receiving the frame including trigger information transmitted from the AP (trigger frame or TF). Each STA can recognize the RU allocated to the STA itself based on the information described in the TF. In addition, each STA can acquire the RU through random access with reference to the TF.

The AP can allocate multiple RUs to one STA at the same time. The multiple RUs can include continuous subcarriers or can include discontinuous subcarriers. The AP can transmit one frame using multiple RUs allocated to one STA or can transmit multiple frames after allocating them to different RUs. At least one of the multiple frames can be a frame including common control information for multiple terminal apparatuses that transmit resource allocation information.

One STA can be allocated multiple RUs by the AP. The STA can transmit one frame using the multiple allocated RUs. Also, the STA can use the multiple allocated RUs to transmit multiple frames allocated to different RUs. The multiple frames can be frames of different types.

The AP can allocate multiple AIDs to one STA. The AP can allocate an RU to each of the multiple AIDs allocated to the one STA. The AP can transmit different frames using the RUs allocated to the multiple AIDs allocated to the one STA. The different frames can be frames of different types.

One STA can be allocated multiple AIDs by the AP. The one STA can be allocated an RU with respect to the multiple allocated AIDs. The one STA recognizes all of the RUs allocated to each of the multiple AIDs allocated to the STA itself as RUs allocated to the STA and can transmit one frame using the multiple allocated RUs. In addition, the one STA can transmit multiple frames using the multiple allocated RUs. At this time, the multiple frames can be transmitted with information indicating the AIDs associated with each of the allocated RUs described therein. The AP can transmit different frames using the RUs allocated to the multiple AIDs allocated to the one STA. The different frames can be frames of different types.

Hereinafter, the base station apparatus and the terminal apparatuses will be collectively referred to as radio communication apparatuses or communication apparatuses. In addition, information exchanged in a case that a certain radio communication apparatus performs communication with another radio communication apparatus will also be referred to as data. In other words, radio communication apparatuses include a base station apparatus and a terminal apparatus.

A radio communication apparatus includes any one of or both the function of transmitting a PPDU and a function of receiving a PPDU. FIG. 1 is a diagram illustrating examples of configurations of a PPDU transmitted by a radio communication apparatus. A PPDU that is compliant with the IEEE 802.11a/b/g standard includes L-STF, L-LTF, L-SIG, and a data frame (a MAC frame, a MAC frame, a payload, a data part, data, information bits, and the like). A PPDU that is compliant with the IEEE 802.11n standard includes L-STF, L-LTF, L-SIG, HT-SIG, HT-STF, HT-LTF, and a data frame. A PPDU that is compliant with the IEEE 802.11ac standard includes some or all of L-STF, L-LTF, L-SIG, VHT-SIG-A, VHT-STF, VHT-LTF, VHT-SIG-B, and a MAC frame. A PPDU studied in the IEEE 802.11ax standard includes some or all of L-STF, L-LTF, L-SIG, RL-SIG in which L-SIG is temporally repeated, HE-SIG-A, HE-STF, HE-LTF, HE-SIG-B, and a data frame. A PPDU studied in the IEEE 802.11be standard includes some or all of L-STF, L-LTF, L-SIG, RL-SIG, U-SIG, EHT-SIG, EHT-STF, HET-LTF, and a data frame.

L-STF, L-LTF, and L-SIG surrounded by the dotted line in FIG. 1 are configurations commonly used in the IEEE 802.11 standard (hereinafter, L-STF, L-LTF, and L-SIG will also be collectively referred to as an L-header). For example, a radio communication apparatus that is compliant with the IEEE 802.11a/b/g standard can appropriately receive an L-header inside a PPDU that is compliant with the IEEE 802.11n/ac standard. A radio communication apparatus that is compliant with the IEEE 802.11a/b/g standard can receive the PPDU that is compliant with the IEEE 802.11n/ac standard while considering it to be a PPDU that is compliant with the IEEE 802.11a/b/g standard.

However, because the radio communication apparatus that is compliant with the IEEE 802.11a/b/g standard cannot demodulate the PPDU that is compliant with the IEEE 802.11n/ac standard following the L-header, it is not possible to demodulate information about a transmitter address (TA), a receiver address (RA), and a duration/ID field used for configuring a NAV.

As a method for the radio communication apparatus that is compliant with the IEEE 802.11a/b/g standard to appropriately configure a NAV (or to perform a receiving operation for a prescribed period), IEEE 802.11 defines a method of inserting duration information to the L-SIG. Information about a transmission speed in the L-SIG (a RATE field, an L-RATE field, an L-RATE, an L_DATARATE, and an L_DATARATE field) and information about a transmission period (a LENGTH field, an L-LENGTH field, and an L-LENGTH) are used by the radio communication apparatus that is compliant with the IEEE 802.11a/b/g standard to appropriately configure a NAV.

Figure 2:
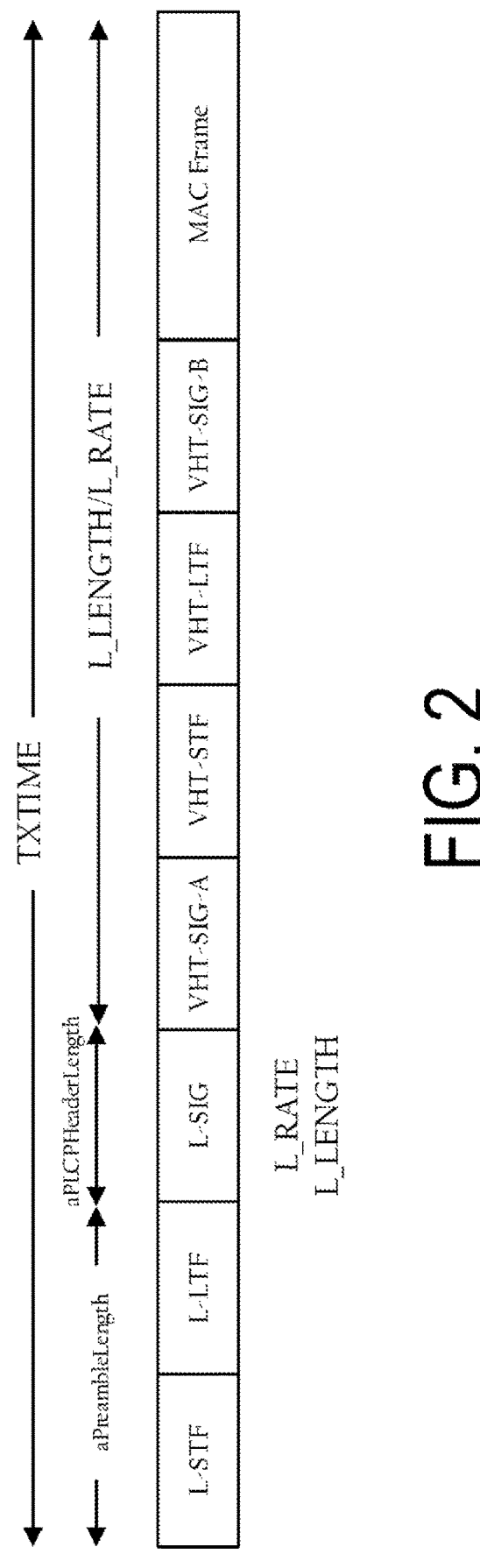
FIG. 2 is a diagram illustrating an example of a frame configuration according to an aspect of the present disclosure.

FIG. 2 is a diagram illustrating an example of a method for duration information inserted into an L-SIG. Although a PPDU configuration that is compliant with the IEEE 802.11ac standard is illustrated as an example in FIG. 2, a PPDU configuration is not limited thereto. A PPDU configuration that is compliant with the IEEE 802.11n standard and a PPDU configuration that is compliant with the IEEE 802.11ax standard may be employed. TXTIME includes information about a length of a PPDU, aPreambleLength includes information about a length of a preamble (L-STF+ L-LTF), and aPLCPHeaderLength includes information about a length of a PLCP header (L-SIG). L_LENGTH is calculated based on Signal Extension that is a virtual period configured for compatibility with the IEEE 802.11 standard, $N_{ops}$ related to L-RATE, aSymbolLength that is information about one symbol (a symbol, an OFDM symbol, or the like), aPLCPServiceLength indicating the number of bits included in PLCP Service field, and aPLCPConvolutionalTailLength indicating the number of tail bits of a convolution code. The radio communication apparatus can calculate L_LENGTH and insert L_LENGTH into L-SIG. In addition, the radio communication apparatus can calculate L-SIG Duration. L-SIG Duration indicates information about a PPDU including L_LENGTH and information about a period that is the sum of periods of Ack and SIFS expected to be transmitted by the destination radio communication apparatus in response to the PPDU.

Figure 3:
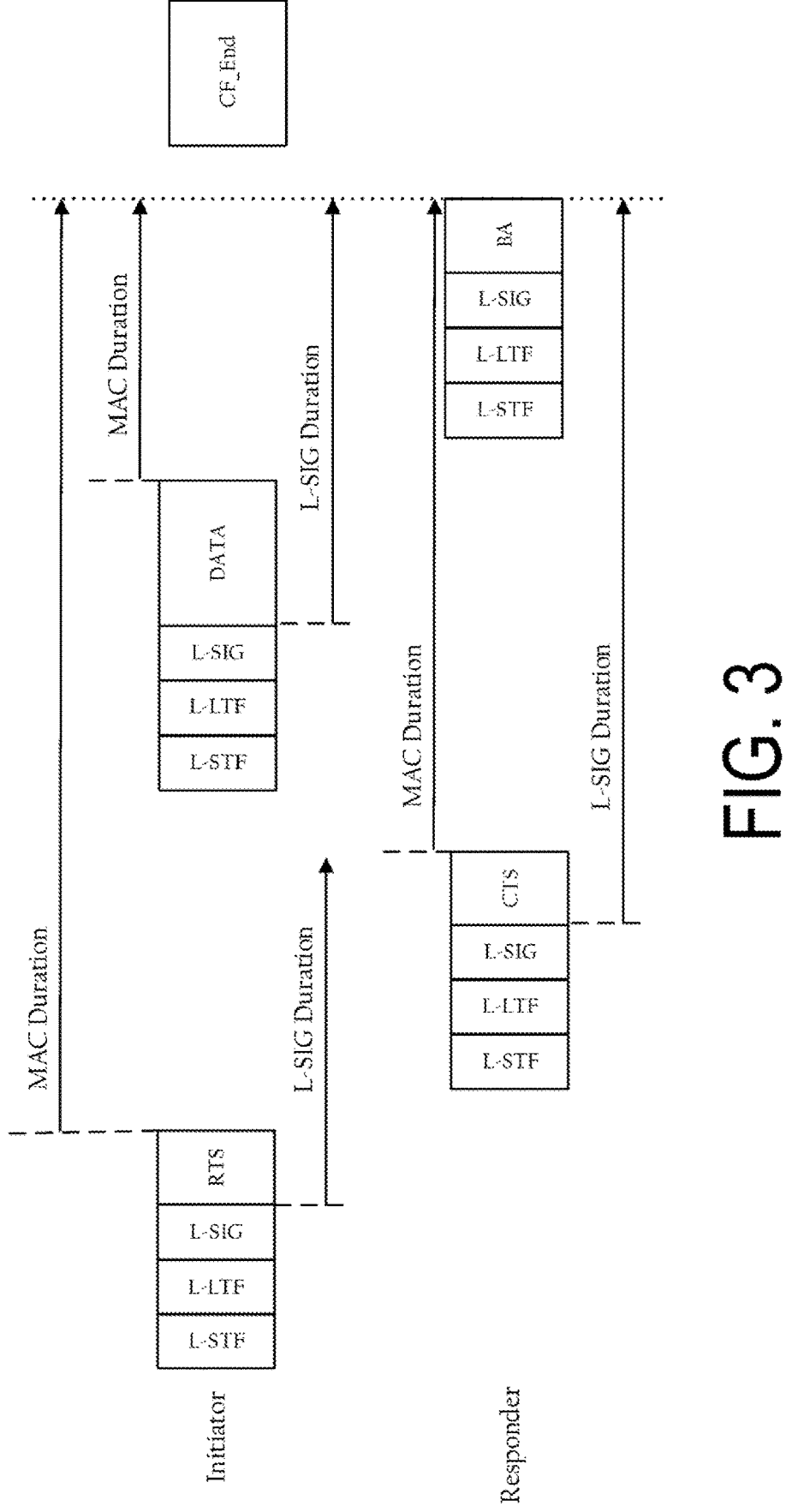
FIG. 3 is a diagram illustrating an example of communication according to an aspect of the present disclosure.

FIG. 3 is a diagram illustrating an example of L-SIG Duration in L-SIG TXOP Protection. DATA (a frame, a payload, data, and the like) include some of or both the MAC frame and the PLCP header. In addition, BA includes Block Ack or Ack. A PPDU includes L-STF, L-LTF, and L-SIG and can further include any one or more of DATA, BA, RTS, or CTS. Although L-SIG TXOP Protection using RTS/CTS is illustrated in the example illustrated in FIG. 3, CTS-to-Self may be used. Here, MAC Duration is a period indicated by a value of Duration/ID field. Furthermore, Initiator can transmit a CF_End frame for providing a notification regarding an end of the L-SIG TXOP Protection period.

Next, a method of identifying a BSS from a frame received by a radio communication apparatus will be described. In order for a radio communication apparatus to identify a BSS from a received frame, the radio communication apparatus that transmits a PPDU preferably inserts information for identifying the BSS (BSS color, BSS identification information, or a value unique to the BSS) into the PPDU. The information indicating the BSS color can be described in HE-SIG-A.

The radio communication apparatus can transmit L-SIG multiple times (L-SIG Repetition). For example, demodulation accuracy of L-SIG is improved by the radio communication apparatus on the reception side receiving L-SIG transmitted multiple times by using Maximum Ratio Combining (MRC). Moreover, in a case that reception of L-SIG has been properly completed using MRC, the radio communication apparatus can interpret the PPDU including the L-SIG as a PPDU that is compliant with the IEEE 802.11ax standard.

Even during the operation of receiving the PPDU, the radio communication apparatus can perform an operation of receiving part of a PPDU other than the corresponding PPDU (e.g., the preamble, L-STF, L-LTF, and the PLCP header prescribed by IEEE 802.11) (also referred to as a double-reception operation). In a case that a part of a PPDU other than the PPDU is detected during the operation of receiving the PPDU, the radio communication apparatus can update a part or an entirety of information about a destination address, a transmission source address, a PPDU, or a DATA period.

An Ack and a BA can also be referred to as a response (response frame). In addition, a probe response, an authentication response, and a connection response can also be referred to as a response.

1. First Embodiment

Figure 5:
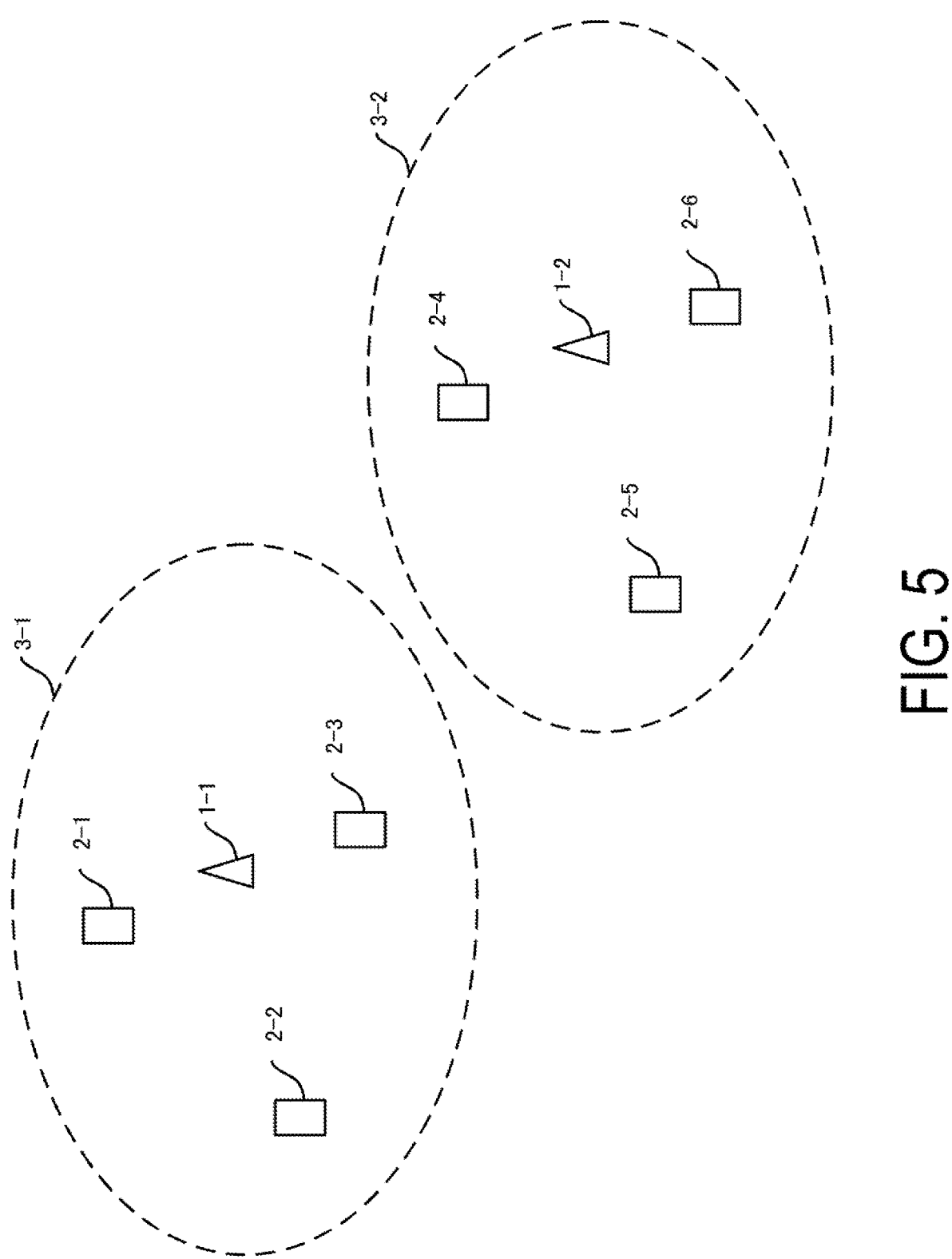
FIG. 5 is a diagram illustrating a configuration example of a communication system according to an aspect of the present disclosure.

FIG. 5 is a diagram illustrating an example of a radio communication system according to the present embodiment. A radio communication system 3-1 includes a radio communication apparatus 1-1 and radio communication apparatuses 2-1 to 2-3. Note that the radio communication apparatus 1-1 will also be referred to as a base station apparatus 1-1, and the radio communication apparatuses 2-1 to 2-3 will also be referred to as terminal apparatuses 2-1 to 2-3. In addition, the radio communication apparatuses 2-1 to 2-3 and the terminal apparatuses 2-1 to 2-3 will also be referred to as a radio communication apparatus 2A and a terminal apparatus 2A, respectively, as apparatuses associated to the radio communication apparatus 1-1. The radio communication apparatus 1-1 and the radio communication apparatus 2A are wirelessly connected and are in a state in which they can transmit and/or receive PPDUs to and from each other. Also, the radio communication system according to the present embodiment may include a radio communication system 3-2 in addition to the radio communication system 3-1. The radio communication system 3-2 includes a radio communication apparatus 1-2 and radio communication apparatuses 2-4 to 2-6. Note that the radio communication apparatus 1-2 will also be referred to as a base station apparatus 1-2 and the radio communication apparatuses 2-4 to 2-6 will also be referred to as terminal apparatuses 2-4 to 2-6. Also, the radio communication apparatuses 2-4 to 2-6 and the terminal apparatuses 2-4 to 2-6 will also be referred to as a radio communication apparatus 2B and a terminal apparatus 2B, respectively, as apparatuses associated to the radio communication apparatus 1-2. Although the radio communication system 3-1 and the radio communication system 3-2 form different BSSs, this does not necessarily mean that extended service sets (ESSs) are different. An ESS indicates a service set forming a local area network (LAN). In other words, radio communication apparatuses belonging to the same ESS can be regarded as belonging to the same network from a higher layer. Also, the BSSs are connected via a Distribution System (DS) and form an ESS. Note that each of the radio communication systems 3-1 and 3-2 can further include a plurality of radio communication apparatuses.

In FIG. 5, it is assumed that signals transmitted by the radio communication apparatus 2A reach the radio communication apparatus 1-1 and the radio communication apparatus 2B while the signals do not reach the radio communication apparatus 1-2 in the following description. In other words, in a case that the radio communication apparatus 2A transmits a signal using a certain channel, whereas the radio communication apparatus 1-1 and the radio communication apparatus 2B determine that the channel is busy, the radio communication apparatus 1-2 determines that the channel is idle. In addition, it is assumed that signals transmitted by the radio communication apparatus 2B arrive at the wireless transmission apparatus 1-2 and the radio communication apparatus 2A, but do not arrive at the radio communication apparatus 1-1. In other words, in a case that the radio communication apparatus 2B transmits a signal using a certain channel, whereas the radio communication apparatus 1-2 and the radio communication apparatus 2A determine that the channel is busy, the radio communication apparatus 1-1 determines that the channel is idle.

A Multi Link Device (MLD) is a device capable of multi-link communication, and an access point apparatus corresponding to the MLD is referred to as an MLD access point apparatus, and a station apparatus corresponding to the MLD is referred to as an MLD station apparatus. The MLD access point apparatus and the MLD station apparatus are also collectively referred to as an MLD radio communication apparatus. In the present embodiment, the above-described radio communication apparatuses 1-1, 1-2, 2A, and 2B are described as MLD radio communication apparatuses. However, in actual operation, not all radio communication apparatuses in the radio communication system need support the MLD.

Figure 9:
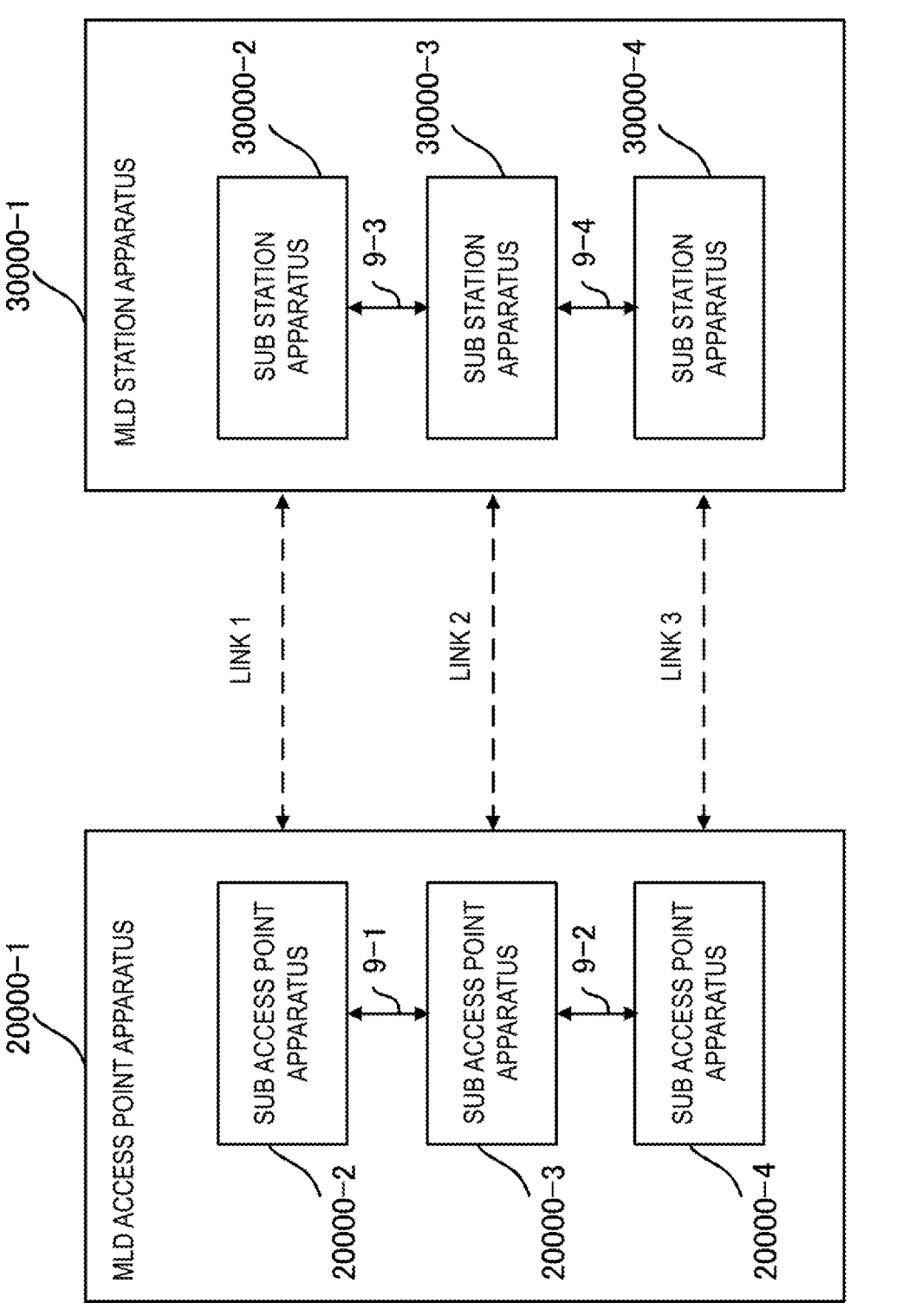
FIG. 9 is a block diagram illustrating a configuration example of a radio communication apparatus according to an aspect of the present disclosure.

An MLD access point apparatus 20000-1 and an MLD station apparatus 30000-1 will be described with reference to FIG. 9. The MLD radio communication apparatus includes multiple sub radio communication apparatuses corresponding to frequency bands (or channels or sub-channels) of respective links (also referred to as physical layer links) constituting the multi-link. FIG. 9 illustrates an example in which the MLD access point apparatus 20000-1 includes three sub radio communication apparatuses, in this case, three sub access point apparatuses (20000-2, 20000-3, and 20000-4), but the number of sub access point apparatuses is an arbitrary number of two or more. Similarly, although FIG. 9 illustrates an example in which the MLD station apparatus 30000-1 includes three sub radio communication apparatuses, in this case, three sub station apparatuses (30000-2, 30000-3, and 30000-4), the number of sub station apparatuses is an arbitrary number of two or more. Note that the sub radio communication apparatus (sub access point apparatus, sub station apparatus, or the like) may include a part of a circuit in the radio communication apparatus, and may be referred to as a sub radio communication unit (sub access point unit, sub station unit).

FIG. 9 illustrates multiple sub radio communication apparatuses as logically separate blocks (squares) for the sake of explanation. Physically, a single radio communication apparatus may be provided. Alternatively, physically separate sub radio communication apparatuses may be configured, and in this case, each sub access point apparatus transmits and/or receives necessary information through connection lines 9-1 and 9-2, and each sub station apparatus transmits and/or receives necessary information through connection lines 9-3 and 9-4. The present embodiment mainly relates to the former case, in other words, a physically one radio communication apparatus (10000-1) is assumed to be provided, and the configuration will be described below with reference to FIG. 6 and FIG. 7.

Note that the number of sub access point apparatuses included in one MLD access point apparatus and the number of sub station apparatuses included in one MLD station apparatus vary depending on the grade, class, and capability of each MLD radio communication apparatus. An MLD radio communication apparatus of a higher grade, a higher class, or higher capability may include more sub radio communication apparatuses (sub access point apparatuses and sub station apparatuses) to be mounted. In other words, the sub radio communication apparatuses (sub access point apparatuses and sub station apparatuses) in each MLD radio communication apparatus located in one radio communication system vary depending on the grade, class, and capability, and the numbers of the apparatuses need not be the same.

The sub station apparatus 30000-2 is connected (associated) to the sub access point apparatus 20000-2 and establishes a link 1. The sub station apparatus 30000-3 is connected (associated) to the sub access point apparatus 20000-3 and establishes a link 2. The sub station apparatus 30000-4 is connected (associated) to the sub access point apparatus 20000-4 and establishes a link 3. In the description of the present embodiment, the number of links constituting the multi-link is three, but is not limited to this and may be any number. In the description of the present embodiment, the carrier frequency of the link 1 is assumed to be in the 2.4 GHz band, the carrier frequency of the link 2 is assumed to be in the 5 GHz band, and the carrier frequency of the link 3 is assumed to be in the 6 GHz band. However, the frequency used by each link can be arbitrarily configured from among the 2.4 GHz band, 5 GHz band, 6 GHz band, 60 GHz band, and other frequencies bands, channels, and sub-channels supported by the radio communication system, and may be changed according to the legal regulations of each country.

Figure 6:
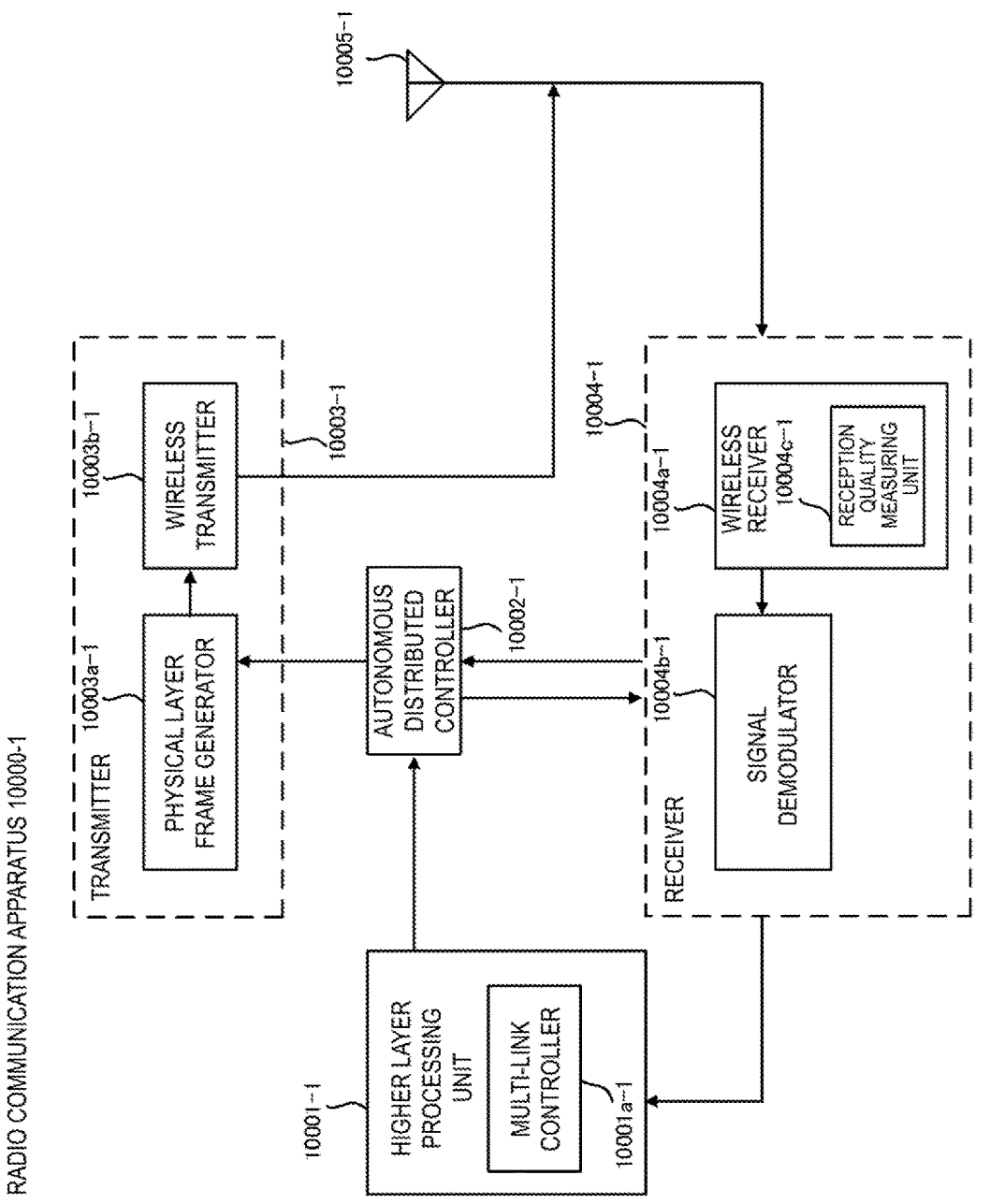
FIG. 6 is a block diagram illustrating a configuration example of a radio communication apparatus according to an aspect of the present disclosure.

FIG. 6 is a diagram illustrating an example of an apparatus configuration of the radio communication apparatus 10000-1. The radio communication apparatus 10000-1 includes a higher layer processing unit (higher layer processing step) 10001-1, an autonomous distributed controller (autonomous distributed control step) 10002-1, a transmitter (transmission step) 10003-1, a receiver (reception step) 10004-1, and an antenna 10005-1.

The higher layer processing unit 10001-1 performs information processing for layers higher than the physical layer, for example, the MAC layer and the LLC layer in regard to information (information related to a transmission frame, a Management Information Base (MIB), and the like) handled in the radio communication apparatus and a frame received from another radio communication apparatus. The multi-link controller 10001*a*-1 may be included in the higher layer processing unit 10001-1, but may be independent of the higher layer processing unit 10001-1.

The higher layer processing unit 10001-1 can notify the autonomous distributed controller 10002-1 of information related to a frame and a traffic transmitted to a radio medium. The information may be control information included in a management frame such as a beacon, for example, or may be measurement information reported by another radio communication apparatus to the radio communication apparatus. Moreover, the information may be control information included in a management frame or a control frame with the destination not limited (the information may be directed to the apparatus, may be directed to another apparatus, may be broadcasting, or may be multicasting).

Figure 7:
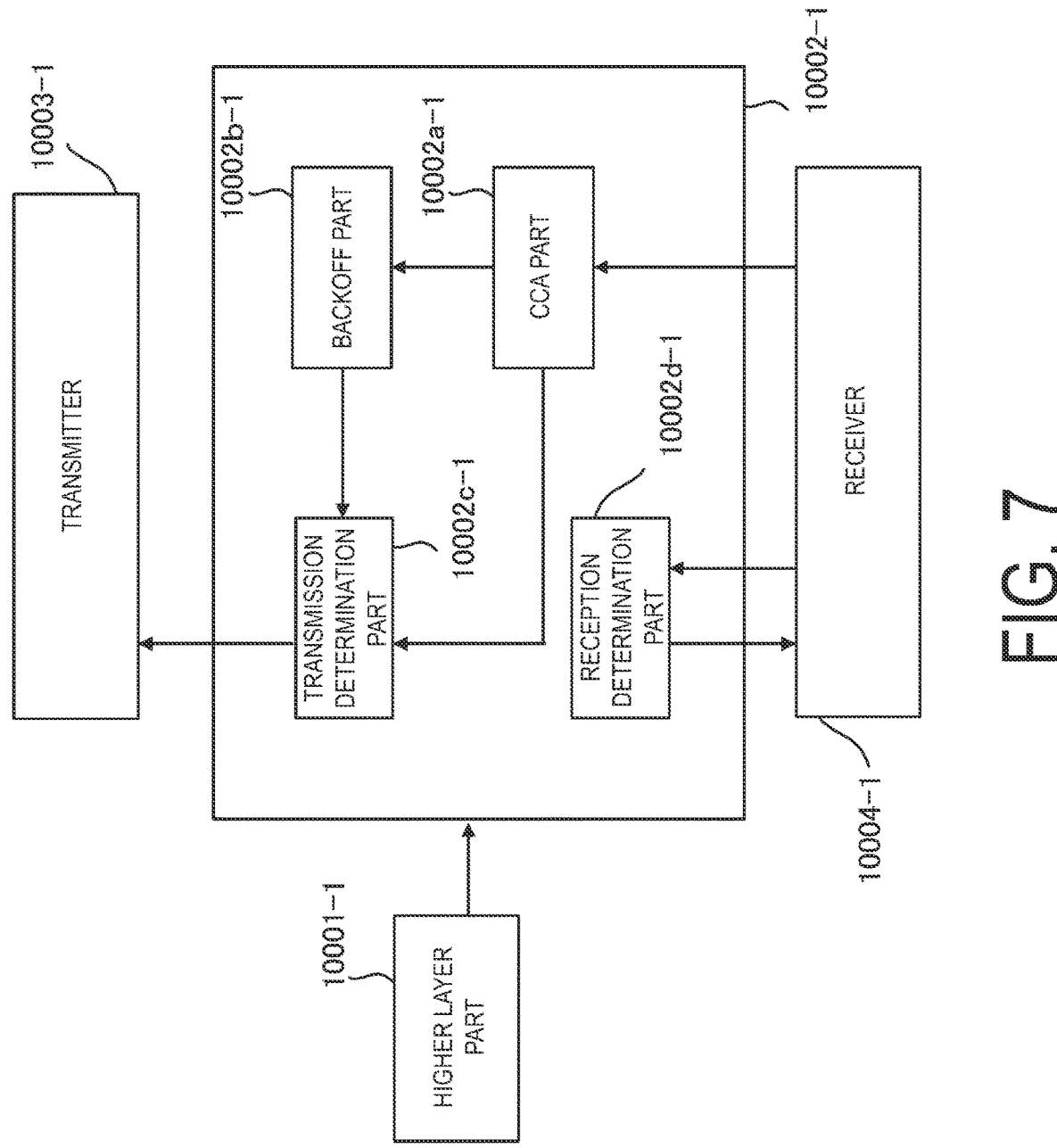
FIG. 7 is a block diagram illustrating a configuration example of a radio communication apparatus according to an aspect of the present disclosure.

FIG. 7 is a diagram illustrating an example of an apparatus configuration of the autonomous distributed controller 10002-1. The controller 10002-1 includes a CCA part (CCA step) 10002*a*-1, a backoff part (backoff step) 10002*b*-1, a transmission determination part (transmission determination step) 10002*c*-1, and a reception determination part (reception determination step) 10002*d*-1.

The CCA processor 10002*a*-1 can perform determination of a state of a radio resource (including determination between a busy state and an idle state) using any one of or both information related to reception signal power received via the radio resource and information related to the reception signal (including information after decoding) provided as a notification from the receiver 10004-1. The CCA part 10002*a*-1 can notify the backoff part 10002*b*-1 and the transmission determination part 10002*c*-1 of the state determination information of the radio resources.

The backoff part 10002*b*-1 can perform backoff using the state determination information of the radio resources. The backoff part 10002*b*-1 has a function of generating a CW and counting down it. For example, countdown of CW is performed in a case that the state determination information of the radio resources indicates idle, and the countdown of the CW can be stopped in a case that the state determination information of the radio resources indicates busy. The backoff part 10002*b*-1 can notify the transmission determination part 10002*c*-1 of the value of the CW.

The transmission determination part 10002*c*-1 performs transmission determination using any one of or both the state determination information of the radio resources and the value of the CW. For example, the transmitter 10003-1 can be notified of transmission determination information in a case that the state determination information of the radio resources indicates idle and the value of the CW is zero. In addition, the transmitter 10003-1 can be notified of the transmission determination information in a case that the state determination information of the radio resources indicates idle.

The transmitter 10003-1 includes a physical layer frame generator (physical layer frame generation step) 10003*a*-1 and a wireless transmitter (wireless transmission step) 10003*b*-1. The physical layer frame generator 10003*a*-1 has a function of generating a physical layer frame (PPDU) based on the transmission determination information notified of from the transmission determination part 10002*c*-1. The physical layer frame generator 10003*a*-1 performs error correction coding, modulation, precoding filter multiplication, and the like on transmission frames sent from the higher layer. The physical layer frame generator 10003*a*-1 notifies the wireless transmitter 10003*b*-1 of the generated physical layer frame.

The reception determination part 10002*d*-1 can indicate reception to the receiver 10004-1. A station apparatus in a Power Management mode (a Sleep mode or a Power Save mode) normally discontinuously receives management frames such as beacons. The information included in the beacon notified to the autonomous distributed controller 10002-1 by the receiver 10004-1 allows determination of whether the access point apparatus buffers the frame addressed to the subject station apparatus. In a case that the access point apparatus buffers the frame addressed to the subject station apparatus, the reception determination part 10002*d*-1 indicates reception to the receiver 10004-1.

The operation of the station apparatus in the Power Management mode will be described in detail. The station apparatus in the Power Management mode normally discontinuously receives management frames such as beacons. The beacon includes information of various Information Elements (IEs, which are also referred to simply as elements or Elements). One of the IEs, a Traffic Indication Map (TIM) IE (FIG. 11) indicates whether the access point apparatus buffers a frame addressed to the station apparatus (accumulates the frame or suspends transmission of the frame) in the Power Management mode. In the example of FIG. 11, 16 bits are allocated to a Partial Virtual Bitmap, and each bit indicates whether the access point apparatus buffers a frame addressed to each AID (each station apparatus). In a case that a set bit indicates that a frame is buffered and a reset bit indicates that no frame is buffered. Note that, normally, setting a bit to "1" is defined as "set", and setting a bit to "0" is defined as "reset". Other values may be used for definition, for example, in contrast, setting a bit to "0" is defined as "set" and setting a bit to "1" is defined as "reset".

A Bitmap Control field includes Bitmap Offset information. For example, a Bitmap Offset value of 0 indicates that each bit in the Partial Virtual Bitmap field indicates whether a frame is buffered in a corresponding one of the station apparatuses corresponding to AID 1 to AID 16 in this order from the left. In FIG. 11, the bits at the positions corresponding to AID 1, AID 4, and AID 8 are set, and this means that the access point apparatus buffers frames addressed to AID 1, AID 4, and AID 8. Given that the Bitmap Offset value is "1" (for the sake of simplicity, in the description, an offset of one byte is applied, but depending on the specification, the offset may be multiplied by a constant, for example, twice the offset, that is, an offset of two bytes may be applied. Alternatively, the offset may be represented in bits). Each bit in the Partial Virtual Bitmap field indicates whether a frame is buffered in a respective one of the station apparatuses corresponding to AID 9 to AID 24 in this order from the left. In FIG. 11, the bits at positions corresponding to AID 9, AID 12, and AID 16 are set, and this means that the access point apparatus buffers frames addressed to AID 9, AID 12, and AID 16. In this way, even in a case that the number of bits allocated to the Partial Virtual Bitmap field is limited, more AIDs can be represented by adjusting the Bitmap Offset value, in other words, more station apparatuses can be notified whether the access point apparatus buffers frames.

Although the physical layer frame generator performs error correction coding on the information bits transferred from the MAC layer, a unit in which error correction coding (coding block length) is performed is not limited. For example, the physical layer frame generator can divide the information bit sequence transferred from the MAC layer into information bit sequences having a predetermined length to perform error correction coding on each of the sequences, and thus can make the sequences into multiple coding blocks. Further, dummy bits can be inserted into the information bit sequence transferred from the MAC layer in a case that coding blocks are configured.

The frame generated by the physical layer frame generator 10003a-1 includes control information. The control information includes information indicating in which RU the data addressed to each radio communication apparatus is allocated (here, the RU includes both frequency resources and spatial resources). In addition, the frame generated by the physical layer frame generator 10003a-1 includes a trigger frame for indicating frame transmission to the radio communication apparatus that is a destination terminal. The trigger frame includes information indicating the RU to be used by the radio communication apparatus that has received the indication for the frame transmission to transmit the frame.

The wireless transmitter 10003b-1 converts the physical layer frame generated by the physical layer frame generator 10003a-1 into a signal in a radio frequency (RF) band to generate a radio frequency signal. Processing performed by the wireless transmitter 10003b-1 includes digital-to-analog conversion, filtering, frequency conversion from a baseband to an RF band, and the like.

The receiver 10004-1 includes a wireless receiver (radio reception step) 10004a-1, a signal demodulator (signal demodulation step) 10004b-1, and a reception quality measuring unit (reception quality measuring step) 10004c-1.

The reception quality measuring unit 10004c-1 generates information related to reception quality from a signal in the RF band received by the antenna 10005-1. The information related to the signal quality includes a received power level, a Signal to Noise Ratio (SNR), and the like. The receiver 10004-1 may notify the autonomous distributed controller 10002-1 (in particular, the CCA part 10002a-1) and the higher layer processing unit 10001-1 (in particular, the multi-link controller 10001a-1) of the information related to the reception quality and the information related to the reception signals. The receiver 10004-1 may also notify the autonomous distributed controller 10002-1 and the higher layer processing unit 10001-1 of other information.

The wireless receiver 10004a-1 has a function of converting a signal in the RF band received by the antenna 10005-1 into a baseband signal and generating a physical layer signal (e.g., a physical layer frame). Processing performed by the wireless receiver 10004a-1 includes frequency conversion processing from the RF band to the baseband, filtering, and analog-to-digital conversion.

The signal demodulator 10004b-1 has a function of demodulating a physical layer signal generated by the wireless receiver 10004a-1. Processing performed by the signal demodulator 10004b-1 includes channel equalization, demapping, error correction decoding, and the like. The signal demodulator 10004b-1 can extract, from the physical layer signal, information included in the PHY header, information included in the MAC header, and information included in the transmission frame, for example. The signal demodulator 10004b-1 can notify the higher layer processing unit 10001-1 of the extracted information. Further, the signal demodulator 10004b-1 can extract any one or all of the information included in the PHY header, the information included in the MAC header, and the information included in the transmission frame.

The antenna 10005-1 includes a function of transmitting the radio frequency signal generated by the wireless transmitter 10003b-1 to a radio space. Also, the antenna 10005-1 includes a function of receiving the radio frequency signal and passing the radio frequency signal to the wireless receiver 10004a-1.

The multi-link controller 10001a-1 receives the information related to the reception quality of the links (the frequency bands, the channels, and the sub-channels) from the reception quality measuring unit 10004c-1, determines whether the respective links are good or bad, and determines which links are selected and used to form the multi-link. The information related to the reception quality includes a reception power level, a Signal to Noise Ratio (SNR), and the like, but is not limited thereto.

The radio communication apparatus 10000-1 can cause radio communication apparatuses in the surroundings of the radio communication apparatus 10000-1 to configure NAV corresponding to a period during which the radio communication apparatus uses a radio medium by describing information indicating the period in the PHY header or the MAC header of the frame to be transmitted. For example, the radio communication apparatus 10000-1 can describe the information indicating the period in a Duration/ID field or a Length field of the frame to be transmitted. The NAV period configured to radio communication apparatuses in the surroundings of the radio communication apparatus will be referred to as a TXOP period (or simply TXOP) acquired by the radio communication apparatus 10000-1. The radio communication apparatus 10000-1 that has acquired the TXOP will be referred to as a TXOP acquirer (TXOP holder). The type of frame to be transmitted by the radio communication apparatus 10000-1 to acquire TXOP is not limited to any frame type, and the frame may be a control frame (e.g., an RTS frame or a CTS-to-self frame) or may be a data frame.

The radio communication apparatus 10000-1 that is a TXOP holder can transmit the frame to radio communication apparatuses other than the radio communication apparatus during the TXOP. In a case that the radio communication apparatus 1-1 is a TXOP holder, the radio communication apparatus 1-1 can transmit a frame to the radio communication apparatus 2A during the TXOP period. In addition, the radio communication apparatus 1-1 can indicate to the radio communication apparatus 2A to transmit a frame addressed to the radio communication apparatus 1-1 during the TXOP period. The radio communication apparatus 1-1 can transmit, to the radio communication apparatus 2A, a trigger frame including information for indicating a frame transmission addressed to the radio communication apparatus 1-1 during the TXOP period.

The radio communication apparatus 1-1 may reserve a TXOP for the entire communication band (e.g., operation bandwidth) in which frame transmission is likely to be performed, or may reserve a TXOP for a specific communication band (Band) such as a communication band in which frames are actually transmitted (e.g., transmission bandwidth).

The radio communication apparatus that provides an indication for transmitting a frame in the TXOP period acquired by the radio communication apparatus 1-1 is not necessarily limited to radio communication apparatuses associated to the radio communication apparatus. For example, the radio communication apparatus can provide an indication for transmitting frames to radio communication apparatuses that are not associated to the radio communication apparatus in order to cause the radio communication apparatuses in the surroundings of the radio communication apparatus to transmit management frames such as a Reassociation frame or control frames such as an RTS/CTS frame.

Furthermore, TXOP in EDCA that is a data transmission method different from DCF will also be described. The IEEE 802.11e standard relates to EDCA and defines TXOP in terms of guaranty of Quality of Service (QoS) for various services such as video transmission and VoIP. The services are roughly classified into four access categories, namely VOice (VO), VIdeo (VI), Best Effort (BE), and Back ground (BK). In general, the services include VO, VI, BE, and BK with higher priority in this order. In each access category, there are parameters including a minimum value CWmin of CW, a maximum value CWmax of CW, Arbitration IFS (AIFS) as a type of IFS, and TXOP limit that is an upper limit value of a transmission opportunity, and values are set to have differences in priority. For example, it is possible to perform data transmission prioritized over the other access categories by setting a relatively small value for CWmin, CWmax, and AIFS of VO with the highest priority for the purpose of voice transmission as compared with the other access categories. For example, in a case of VI with a relatively large amount of transmission data to transmit a video, it is possible to extend a transmission opportunity as compared with the other access categories by configuring TXOP limit to be large. In this manner, four parameter values of the access categories are adjusted for the purpose of guaranteeing QoS in accordance with various services.

In the present embodiment, the signal demodulator of the station apparatus can perform a decoding process the received signal in the physical layer, and perform error detection. Here, the decoding process includes decoding of codes that have been error-corrected which is applied to the received signal. Here, the error detection includes error detection using an error detection code (e.g., a cyclic redundancy check (CRC) code) that has been given to the received signal in advance, and error detection using an error detection code (e.g., low-density parity-check code (LDPC)) having an error detection function from the first. The decoding processing in the physical layer can be applied for each coding block.

The higher layer processing unit transfers the result of decoding of the physical layer by the signal demodulator to the MAC layer. In the MAC layer, the signal of the MAC layer is restored from the transferred decoding result of the physical layer. Then, error detection is performed in the MAC layer, and it is determined that whether the signal of the MAC layer transmitted by the station apparatus as a transmission source of the reception frame has been correctly restored.

Figure 10:
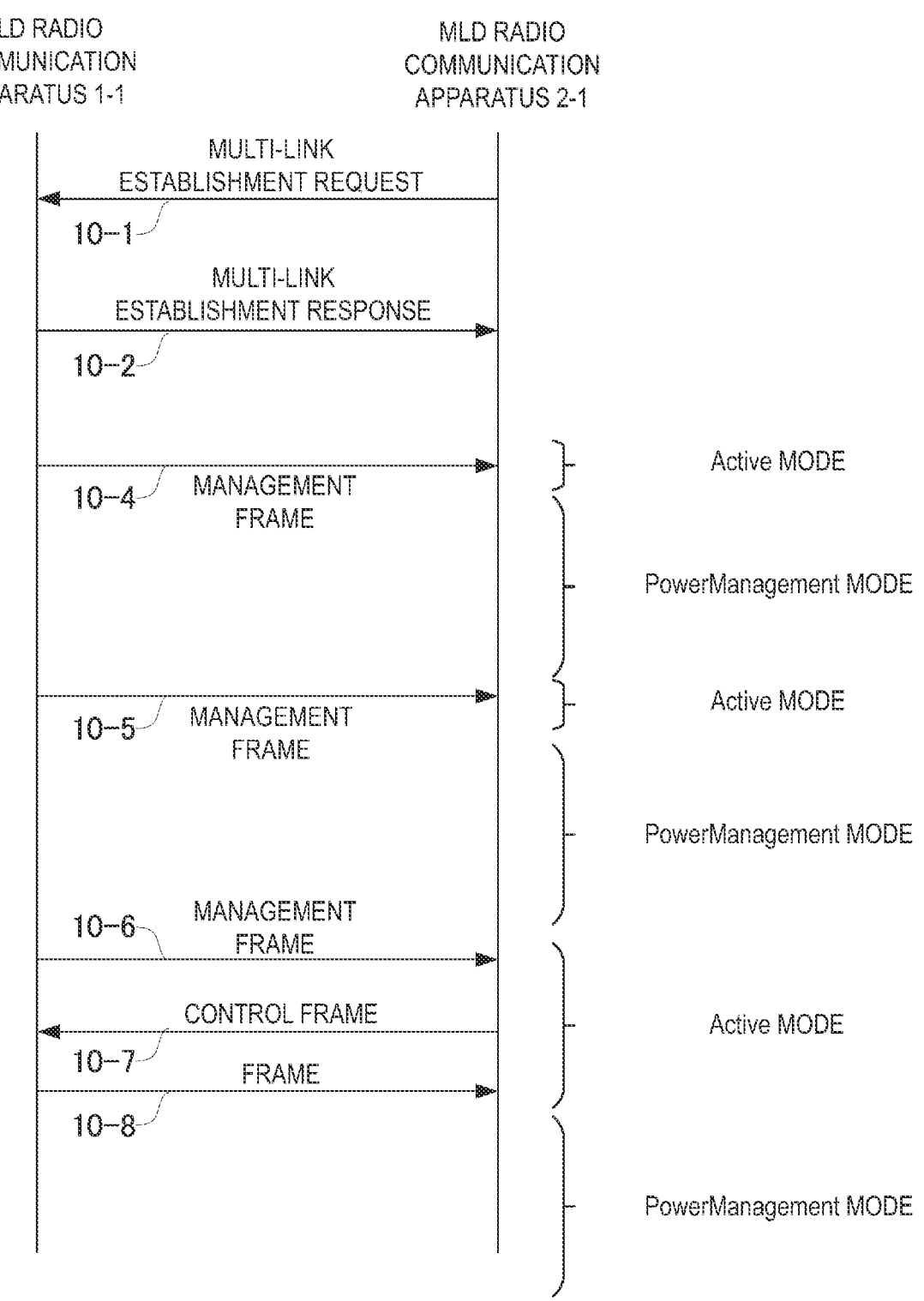
FIG. 10 is a diagram illustrating frame transmission and/or reception according to an aspect of the present disclosure.

FIG. 10 illustrates an outline of a procedure related to the multi-link of the present embodiment by using an MLD radio communication apparatus 1-1 (hereinafter also referred to as the MLD access point apparatus in the present description) and an MLD radio communication apparatus 2-1 (hereinafter also referred to as the MLD station apparatus in the present description) as examples of radio communication apparatuses. In this case, the MLD radio communication apparatus 2-1 that transmits a multi-link establishment request 10-1 is referred to as a multi-link initiator, and the multi-link establishment request 10-1 is transmitted to the MLD radio communication apparatus 1-1. The multi-link establishment request may include control information such as multi-link capability information (Capability information) of the subject radio communication apparatus and multi-link operation mode information regarding the multi-link requested to be established. The multi-link establishment request 10-1 may be included in a management frame such as an Association Request frame. Note that the multi-link initiator may be the MLD radio communication apparatus 1-1 instead of the MLD radio communication apparatus 2-1. The multi-link establishment request may be transmitted independently and separately on each link, or may be transmitted on one of the links constituting the multi-link.

In response to receiving the multi-link establishment request, the MLD radio communication apparatus 1-1 transmits a multi-link establishment response to the MLD radio communication apparatus 2-1. The multi-link establishment response 10-2 may include control information such as multi-link capability information of the subject radio communication apparatus, establishment state information indicating whether multi-link establishment has succeeded, a multi-link ID used to identify the multi-link, and multi-link operation mode information. The multi-link operation mode information included in the multi-link establishment response may be finally determined based on the multi-link operation mode included in the multi-link establishment request received from the MLD radio communication apparatus 2-1 and the multi-link operation mode that can be provided by the radio communication apparatus 1-1. The multi-link operation mode information may include information regarding a frequency band (or channel, or sub-channel) used in the established multi-link communication. In a case that the establishment state information indicates success, the multi-link is established that conforms to the multi-link operation mode information included in the multi-link establishment response. In a case that the establishment status information indicates failure, the multi-link cannot be established. A management frame such as an Association Response frame may include the multi-link establishment response 10-2.

After multi-link establishment (including Association resulting from exchange of a multi-link establishment request/response), the MLD station apparatus supporting the Power Management mode transitions to a mode for discontinuous reception of management frames such as beacons (including some Action frames and the like. 10-4, 10-5, and 10-6) transmitted by the MLD station apparatus to perform a power saving operation. The management frames 10-4, 10-5, and 10-6 may include information for notifying whether the MLD access point apparatus buffers (accumulates or suspends transmission of) a frame addressed to the MLD station apparatus in the Power Management mode. Specifically, in addition to the above-described TIM IE, examples of the information include an AID Bitmap Element (AID bitmap information) having a role similar to that of the TIM IE for Multi-Link and a Multi-Link Traffic Indication Element (multi-link traffic indication information, multi-link traffic information) including information indicating (or recommending) a link used by each MLD station apparatus. Based on the TIM IE, the AID Bitmap Element, the Multi-Link Traffic Indication Element, or the like, the MLD station apparatus may detect and determine whether the MLD access point apparatus corresponding to the connection destination buffers (accumulates) a frame addressed to the subject MLD station apparatus. Note that the AID Bitmap element may be replaced with the TIM IE and thus that the embodiment holds true in the description below even in a case that the AID Bitmap element in the description below is replaced with the TIM IE.

FIG. 10 illustrates an example of a sequence in which the MLD station apparatus supporting the Power Management mode receives and retrieves a frame buffered by the MLD access point apparatus. The MLD station apparatus switches to an Active mode (a mode for transmission and/or reception) in order to discontinuously receive the frames 10-4, 10-5, and 10-6. The MLD station apparatus receives the frames 10-4 and 10-5 and checks the AID Bitmap Element and the Multi-Link Traffic Indication Element. As a result, in response to detecting that the MLD access point apparatus buffers no frame addressed to the subject MLD station apparatus, the MLD station apparatus returns to the Power Management mode (Power Save mode or sleep mode). The MLD station apparatus receives the management frame 10-6 and checks the AID Bitmap Element and the Multi-Link Traffic Indication Element. As a result, in response to detecting that the MLD access point apparatus buffers a frame addressed to the subject MLD station apparatus, the MLD station apparatus transmits a control frame 10-7 to the MLD station. In response to receiving the control frame 10-7, the MLD access point apparatus detects that the MLD station apparatus is in the active mode, and transmits a buffered frame 10-8 (which may be multiple frames) to the MLD station apparatus. The MLD station apparatus completes reception of the frame 10-8 buffered by the access point apparatus and transitions from the Active mode to the Power Management mode.

Figure 12:
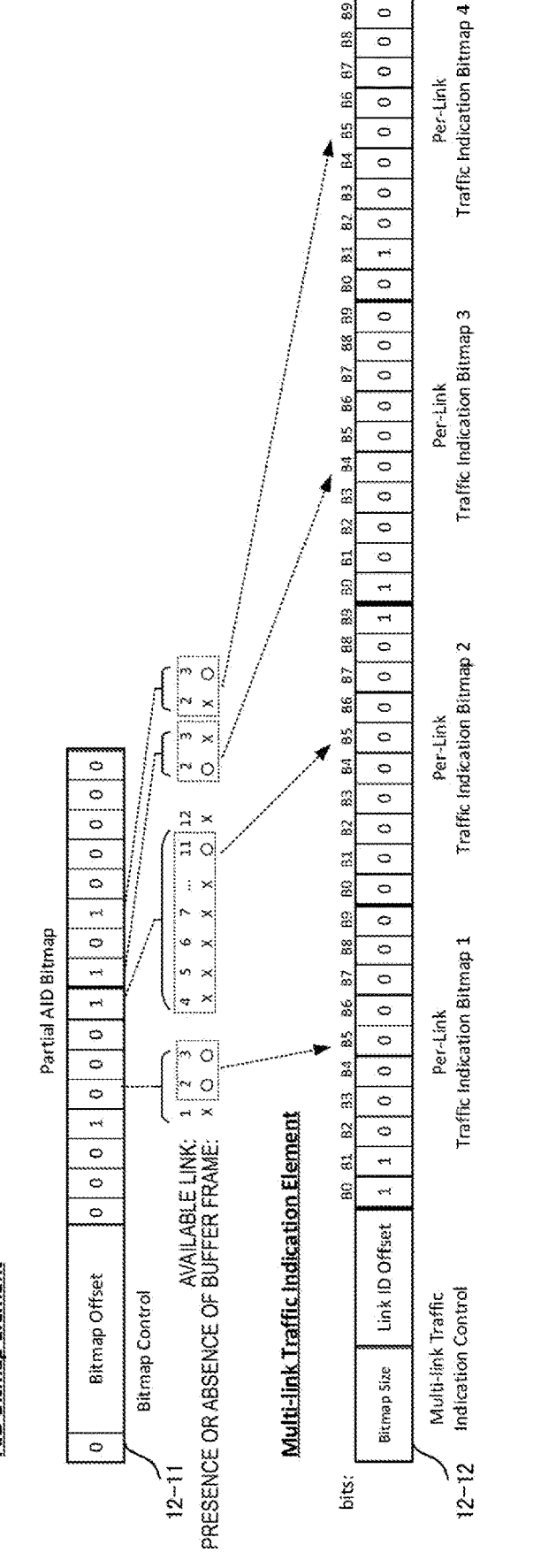
FIG. 12 is a diagram illustrating an example of a frame configuration according to an aspect of the present disclosure.

FIG. 12 illustrates examples of the AID Bitmap Element and the Multi-Link Traffic Indication Element in the multi-link connection. In the description with reference to FIG. 12, description is given on a case in which the MLD access point apparatus supports 12 links from the links 1 to 12, and connects to multiple MLD station apparatuses, and each MLD access point apparatus checks the contents of the AID Bitmap Element and the Multi-Link Traffic Indication Element included in the management frames (beacons, Action frames, or the like) received through the link 2 to determine whether the MLD access point apparatus buffers a frame addressed to the MLD station apparatus. Actually, the number of links may be a value other than 12 as described above, and varies depending on the capability of the MLD access point apparatus or the MLD station apparatuses. A link other than the link 2 may be used to receive the management frame including the AID Bitmap Element and the Multi-Link Traffic Indication Element. A non-MLD radio communication apparatus other than the MLD station apparatus may connect to the MLD access point apparatus.

In FIG. 12, the Bitmap Offset of the AID Bitmap element has a value of 0 and the Partial AID Bitmap is allocated 16 bits, thus allowing AID 1 to AID 16 to be represented. Here, each bit in the Partial AID Bitmap (which has a role equivalent to the role of the above-described Partial Virtual Bitmap. The embodiment holds true in the description below even in a case that the Partial AID Bitmap is interpreted as the Partial Virtual Bitmap) field indicates whether a frame is buffered that is addressed to the station apparatuses corresponding to AID 1 to AID 16 in this order from the left. In this example, bits at positions corresponding to AID 4, AID 8, AID 9, and AID 11 are set, and thus the MLD access point apparatus buffers frames addressed to the MLD station apparatuses corresponding to AID 4, AID 8, AID 9, and AID 11.

The MLD access point apparatus can pre-negotiate with each MLD station apparatus about which link is used to transmit the buffered frame. Alternatively, the MLD access point apparatus can also present each MLD station apparatus with a link recommended for use.

TID-to-Link Mapping is an example of a mechanism for pre-negotiation. In a default operation, there is no special association between the value of a Traffic ID (TID) of a frame and a link for transmitting the frame, and a frame of any TID may be transmitted on any link. This is referred to as default TID-to-Link mapping. On the other hand, a frame having a specific TID can be mapped through pre-negotiation for transmission of the frame through a specific link. This procedure is referred to as TID-to-Link Mapping, and as a result, non default TID-to-Link Mapping is formed. For example, a frame classified into an Access Category (AC) of Voice cannot accept a great delay, TID-to-Link Mapping may be used to map a frame of the corresponding TID to a link subjected to little interference, leading to less likelihood of congestion.

A mechanism for presenting each MLD station apparatus with a link recommended for use is referred to as Link Recommendation. A link recommended for use depending on the situation may be presented to the MLD station apparatus operating in accordance with the default TID-to-Link mapping. The link recommended for use depending on the situation may be presented to the MLD station apparatus operating in accordance with the non default TID-to-Link Mapping (in particular, this is applicable, for example, in a case that one TID is mapped to multiple links and one of the links is recommended).

In the example of FIG. 12, for the MLD station apparatus with AID 4, the links 1 to 3 are assumed to be enabled and to be available, and the links 2 and 3 are assumed to buffer frames (or assumed to be recommended for use). For the MLD station apparatus with AID 8, the links 4 to 12 are assumed to be enabled, and the link 11 is assumed to buffer a frame (or assumed to be recommended for use). For the MLD station apparatus with AID 9, the links 2 and 3 are assumed to be enabled, and the link 2 is assumed to buffer a frame (or assumed to be recommended for use). For the MLD station apparatus with AID 11, the links 2 and 3 are assumed to be enabled, and the link 3 is assumed to buffer a frame (or assumed to be recommended for use).

The Multi-link Traffic Indication Element is used to indicate which link is indicated (recommended) for use to each MLD station apparatus by the MLD access point apparatus. The Multi-link Traffic Indication Element includes a Bitmap Size field, a Link ID Offset field (link ID offset information, link offset information), multiple Per-Link Traffic Indication Bitmap fields, and the like. However, the Multi-link Traffic Indication Element may exclude any of the above-described fields or may include an AID offset field as another field. The AID Offset has a role similar to that of the Bitmap Offset in the Partial AID Bitmap, and a specific operation will be described below.

The Bitmap Size field indicates the number of bits to be allocated to each Per-Link Traffic Indication Bitmap (traffic indication bitmap) and may be information of the number of links indicating the number of links represented by each Per-Link Traffic Indication Bitmap field. The Bitmap Size field may include a content indicating the number of Per-Link Traffic Indication Bitmaps. The Bitmap Size field may include information regarding the number of bytes or bits allocated to the Per-Link Traffic Indication Bitmap. In this example, it is assumed that each Per-Link Traffic Indication Bitmap is indicated to be allocated 10 bits. The Bitmap Size field may include information indicating the inclusion of four Per-Link Indication Bitmaps, the allocation of 40 bits (10×4 bits, 5 bytes) to the Per-Link Indication Bitmap, or the like.

The Link ID Offset field sets a value indicating the start number (offset value) of the link number pointed to by each Per-Link Traffic Indication Bitmap. This example assumes that the link number is indicated to start with the link 2, in other words, the 10 bits constituting each Per-Link Traffic Indication Bitmap respectively indicate the links 2 to 11.

In FIG. 12, the Per-Link Traffic Indication Bitmap 1 sets "1", "1", "0", "0", "0", "0", "0", "0", "0", and "0", indicating that the use of the links 2 and 3 is notified. The Per-Link Traffic Indication Bitmap 2 sets "0", "0", "0", "0", "0", "0", "0", "0", "0", and "1", indicating that the use of the link 11 is notified. The Per-Link Traffic Indication Bitmap 3 sets "1", "0", "0", "0", "0", "0", "0", "0", "0", and "0", indicating that the use of the link 2 is notified. The Per-Link Traffic Indication Bitmap 4 sets "0", "1", "0", "0", "0", "0", "0", "0", "0", "0", and "0", indicating that the use of the link 3 is notified.

An operation will be described that is performed in a case that the AID Offset field of the Multi-Link Traffic Indication Element indicates the offset amount. As an example, in a case that 1 byte (8 bits) is configured as the AID Offset, the Multi-Link Traffic Indication Element includes the Per-Link Traffic Indication for the MLD station apparatuses corresponding to the AIDs following AID 9 corresponding to the position of 1 byte (8 bits) offset (shift) in the Partial AID Bitmap, in other words, skip from AID 1 to AID 8. In other words, in FIG. 12, the Multi-Link Traffic Indication Element can be configured that does not include the Per-Link Traffic Indication 1 for AID 5 or the Per-Link Traffic Indication 2 for AID 8 but includes the Per-Link Traffic Indication 3 for AID 9 and the Per-Link Traffic Indication 4 for AID 11.

In the example of FIG. 12, of the four MLD station apparatuses for which bits are set in the Partial AID Bitmap, the use of a lower link number is indicated (or recommended) to the MLD station apparatuses corresponding to AID 4, AID 9, and AID 11, whereas the use of a higher link number is indicated (or recommended) to the MLD station apparatus corresponding to AID 8. The purpose of the Link ID Offset field is to reduce the amount of bits consumed by each Per-Link Traffic Indication. However, even in a case that the use of the link is indicated to start with the link 2 as in this example, the Per-Link Traffic Indication Bitmap field needs to represent the links 2 to 11 under the effect of AID 9 to which the use of a higher link number is indicated (or recommended), and thus each Per-Link Traffic Indication Bitmap field consumes 10 bits, corresponding to a large amount of bit resources. As a method for solving this problem, the number of bits consumed in each Per-Link Traffic Indication Bitmap field may be reduced by setting multiple Bitmap Size fields and Link ID Offset fields in one Multi-Link Traffic Indication Element. This will be described with reference to FIG. 13.

Figure 13:
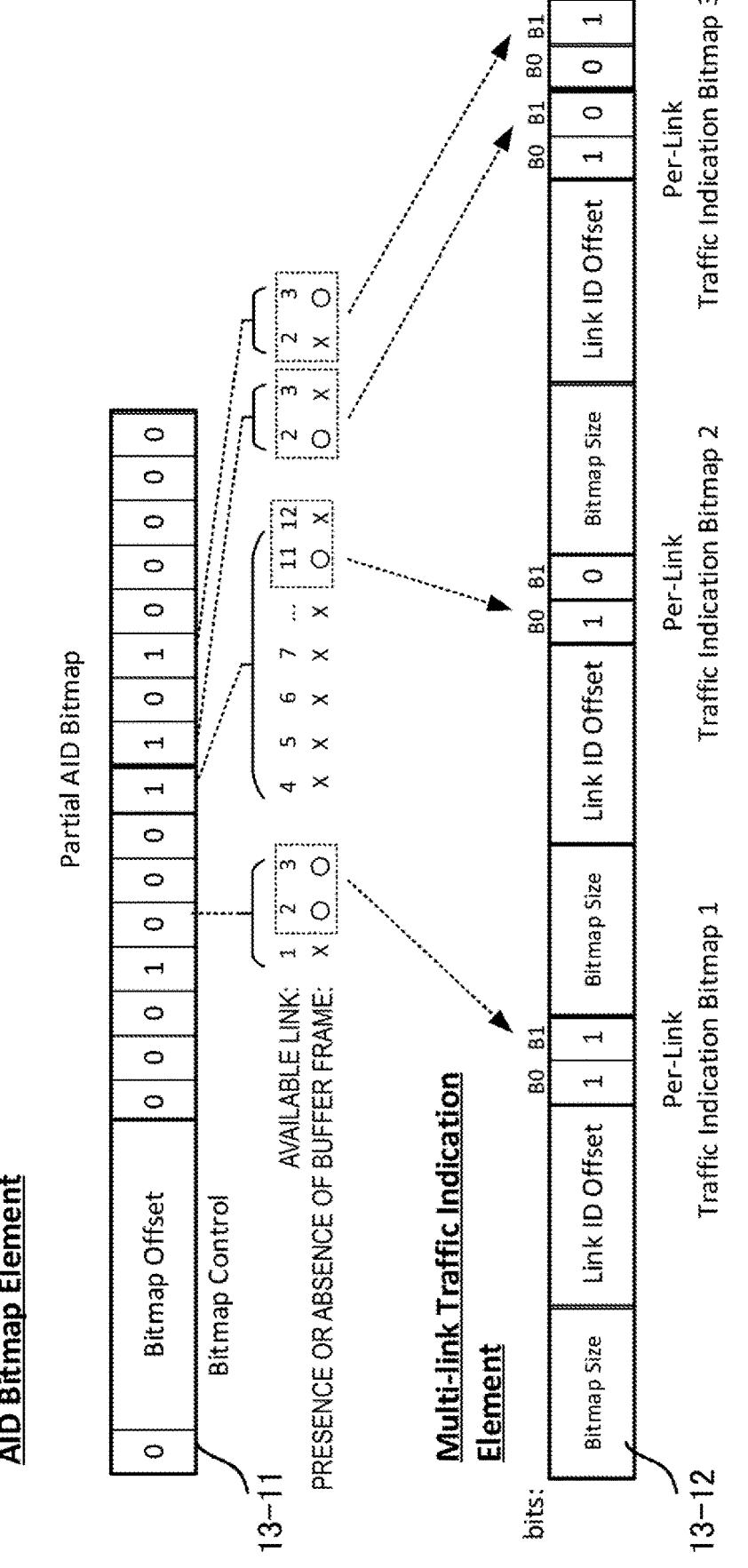
FIG. 13 is a diagram illustrating an example of a frame configuration according to an aspect of the present disclosure.

The example of FIG. 13 corresponds to the combination of three Bitmap Size fields and three Link ID Offset field is used for the Multi-Link Traffic Indication Element. The first combination of the Link ID Offset field and the Bitmap Size field indicates notification to the MLD station apparatus corresponding to AID 4. Here, the Bitmap Size field indicates that each Per-Link Traffic Indication Bitmap is constituted with 2 bits and the number of Per-Link Traffic Indication Bitmaps included is 1. The Link ID Offset field is set to "1" to indicate that the link pointed to by each Per-Link Traffic Indication Bitmap starts with the link 2. The Per-Link Traffic Indication Bitmap 1 sets "1" and "1", indicating that the use of the links 2 and 3 is notified to the MLD station apparatus corresponding to AID 4.

The second combination of the Link ID Offset field and the Bitmap Size field indicates notification to the MLD station apparatus corresponding to AID 8. The Bitmap Size indicates that each Per-Link Traffic Indication Bitmap is constituted with 2 bits and that the number of Per-Link Traffic Indication included Bitmaps is 1. The Link ID Offset field is set to "10" to indicate that the link pointed to by each Per-Link Traffic Indication Bitmap starts with the link 11. The Per-Link Traffic Indication Bitmap 2 sets "1" and "0", indicating that the use of the link 11 is notified to the MLD station apparatus corresponding to the AID 8.

The third combination of the Link ID Offset field and the Bitmap Size field indicates notification to the MLD station apparatuses corresponding to AID 9 and AID 11. The Bitmap Size indicates that each Per-Link Traffic Indication Bitmap is constituted with 2 bits and the number of Per-Link Traffic Indication Bitmaps included is 2. The Link ID Offset field is set to "1" to indicate that the link pointed to by each Per-Link Traffic Indication Bitmap starts with the link 2. The Per-Link Traffic Indication Bitmap 3 sets "1" and "0", indicating that the use of the link 2 is notified to the MLD station apparatus corresponding to the AID 9. The Per-Link Traffic Indication Bitmap 4 sets "0" and "1", indicating that the use of the link 3 is notified to the MLD station apparatus corresponding to the AID 11.

FIG. 13 is an example in which the first combination of the Bitmap Size field and the Link ID Offset field indicates (or recommends) a link to be used by the MLD station apparatus corresponding to one AID (AID 4 in this example), the second combination of the Bitmap Size field and the Link ID Offset field indicates (or recommends) a link to be used by the MLD station apparatus corresponding to one AID (AID 8 in this example), and the third combination of the Bitmap Size field and the Link ID Offset field indicates (or recommends) links to be used by the MLD station apparatuses corresponding to two AIDs (AID 9 and AID 11 in this example). The number of AIDs to which indication (or recommendation) is provided by each combination of the Bitmap Size field and the Link ID Offset field can be freely changed by a value indicated in the Bitmap Size field. In other words, the combination of the Bitmap Size field and the Link ID Offset field may be added to each AID as the minimum unit, or the combination of the Bitmap Size field and the Link ID Offset field may be shared by multiple AIDs.

The combination of the Bitmap Size field and the Link ID Offset field may be divided into multiple Information Elements for description. In the example described with reference to FIG. 13, the Link ID Offset is "1" for AID 4, AID 9, and AID 11, and the Link ID Offset is "10" for AID 8. The two cases described above are respectively a representative example where the use of a lower link number is indicated (or recommended) among link numbers and a representative example where the use of a higher link number is indicated (or recommended) among the link numbers. As a modified example of the frame configuration illustrated in FIG. 13, FIG. 14 illustrates an example in which the AIDs are classified into a group with a Link ID Offset of "1" and a group with a Link ID Offset of "10", and the groups are described in separate Information Elements.

Figure 14:
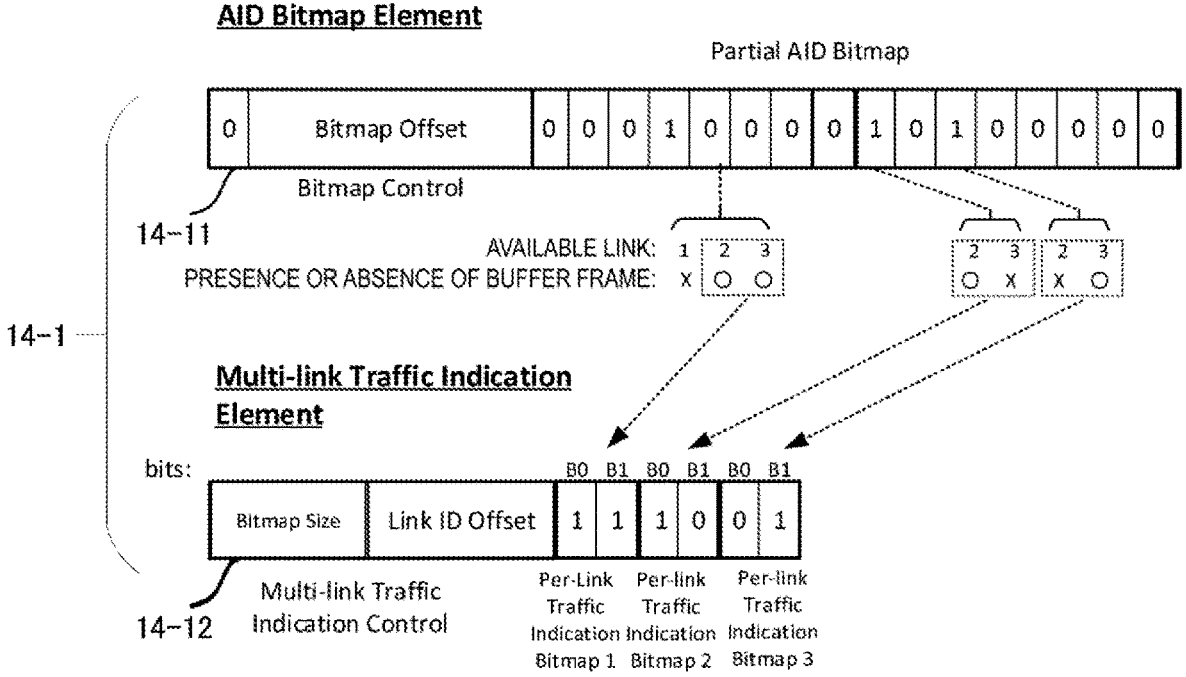
FIG. 14 is a diagram illustrating an example of a frame configuration according to an aspect of the present disclosure.
Figure 14:
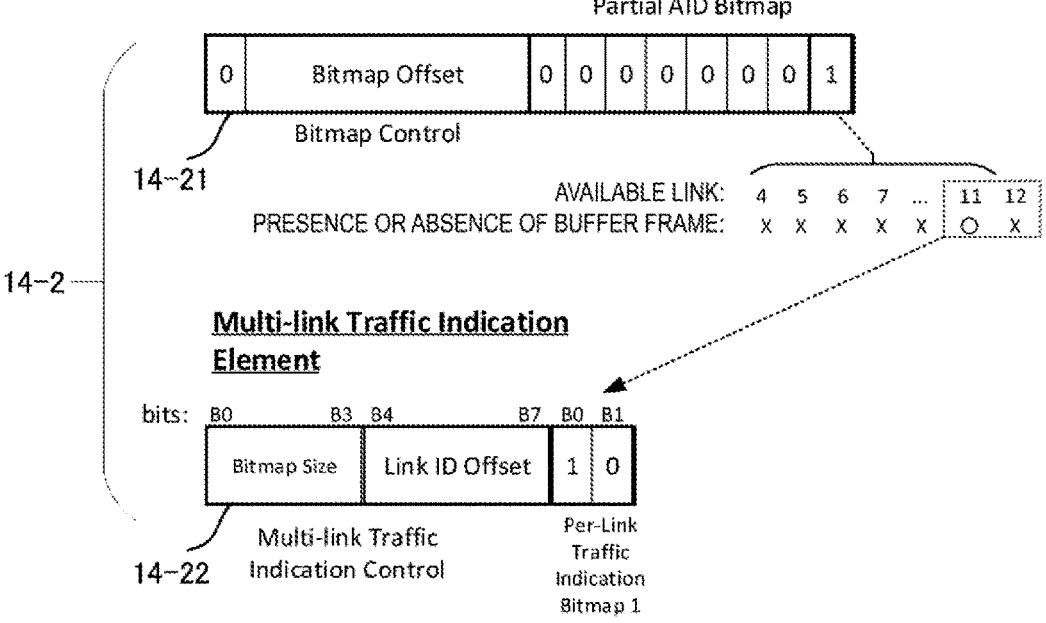

In the example of FIG. 14, the AID Bitmap Element 14-11 is assumed to be used to provide notification to the AID notified of the link to be used by using the Multi-Link Traffic Indication Element 14-12 with a link ID offset of "1". The AID Bitmap Element 14-21 is assumed to be used to provide notification to the AID notified of the link to be used by using the Multi-Link Traffic Indication Element 14-22 with a link ID offset of "10". In this example, with the combinations of the Bitmap Size field and the Link ID Offset field described in separate Information Elements, the AID Bitmap Element is also divided into the AID Bitmaps elements 14-11 and 14-21 respectively associated with the Multi-Link Traffic Indication fields 14-12 and 14-22. This is merely an example, and multiple AID Bitmap Elements need not be prepared as long as to which AID each Per-Link Traffic Indication Element included in each Multi-Link Traffic Indication Element corresponds can be determined.

The association between the AID Bitmap Element 14-11 and the Multi-Link Traffic Indication Element 14-12 and the association between the AID Bitmap Element 14-21 and the Multi-Link Traffic Indication Element 14-22 may follow the order in which these Information Elements are arranged in the corresponding management frame (beacon, Action frame, or the like). For example, in the management frame, in a case that the AID Bitmap Elements are arranged in the order of 14-11 and 14-21 and the Multi-Link Traffic Indication Elements are arranged in the order of 14-12 and 14-22, 14-11 and 14-12 are associated with each other and 14-21 and 14-22 are associated with each other. In the management frame, given that the AID Bitmap Elements are arranged in the order of 14-11 and 14-21 and the Multi-Link Traffic Indication Elements are arranged in the order of 14-22 and 14-12, 14-11 and 14-22 are associated with each other and 14-21 and 14-12 are associated with each other.

A field including an "association identifier" for associating the AID Bitmap Element with the Multi-Link Traffic Indication Element may be allocated in each of the AID Bitmap Elements and the Multi-Link Traffic Indication Elements. In a case that the "association identifier" of the AID Bitmap Element (X) matches the "association identifier" of the Multi-Link Traffic Indication Element (Y), the association is such that the AID Bitmap Element (X) is the AID Bitmap Element for the Multi-Link Traffic Indication Element (Y). In other words, the Multi-Link Traffic Indication Element (Y) is used to notify the link used by each MLD station apparatus corresponding to the AID for which the corresponding bits are set in the Partial AID Bitmap of the AID Bitmap element (X).

In a combination 14-1 of the AID Bitmap Element and the Multi-Link Traffic Indication Element in FIG. 14, bits corresponding to AID 4, AID 9, and AID 11 with a Link ID Offset of "1" in FIG. 13 are set in the Partial AID Bitmap of the AID Bitmap Element 14-11, and the links used by the MLD station apparatuses corresponding to the AIDs are notified by the Multi-link Traffic Indication Element 14-12. In this example, the Bitmap Size field is assumed to contain information indicating that each Per-Link Traffic Indication Bitmap is constituted with 2 bits. The Link ID Offset is set to "1" to indicate that the link pointed to by each Per-Link Traffic Indication Bitmap starts with the link 2. The Per-Link Traffic Indication Bitmap 1 sets "1" and "1", indicating that the use of the links 2 and 3 is notified to the MLD station apparatus corresponding to AID 4. The Per-Link Traffic Indication Bitmap 2 sets "1" and "0", indicating that the use of the link 2 is notified to the MLD station apparatus corresponding to AID 9. The Per-Link Traffic Indication Bitmap 3 sets "0" and "1", indicating that the use of the link 3 is notified to the MLD station apparatus corresponding to AID 11.

In a combination 14-2 of the AID Bitmap Element and the Multi-Link Traffic Indication Element in FIG. 14, the bits corresponding to AID 8 with a Link ID Offset of "10" in FIG. 13 are set in the Partial AID Bitmap of the AID Bitmap Element 14-21, and the link used by the MLD station apparatus corresponding to the AID is notified by the Multi-link Traffic Indication Element 14-22. In this example, the Bitmap Size field is assumed to contain information indicating that each Per-Link Traffic Indication Bitmap is constituted with 2 bits. The Link ID Offset is set to "10" to indicate that the link pointed to by each Per-Link Traffic Indication Bitmap starts with the link 11. For AID 9 and the subsequent AIDs, "10" is not used as the Link ID Offset, and thus the Partial AID Bitmap may describe only one byte indicating each of AID 1 to AID 8. The Per-Link Traffic Indication Bitmap 1 sets "1" and "0", indicating that the use of the link 11 is notified to the MLD station apparatus corresponding to AID 8.

FIG. 14 illustrates the example including the two combinations of the AID Bitmap Element and the Multi-Link Traffic Indication Element, i.e., 14-1 and 14-2. However, more than two combinations may be provided.

One of multiple combinations of the AID Bitmap Element and the Multi-Link Traffic Indication Element may be configured to represent all links supported by the MLD access point apparatus. For example, in a case that the MLD access point apparatus supports 16 links, the Bitmap Size field may indicate the number of bits allocated to each Per-Link Traffic Indication Bitmap as "16" corresponding to the total number of links in such a manner that the number of links represented by each Per-Link Traffic Indication Bitmap field correspond to the links 1 to 16.

In the first embodiment, as illustrated in FIG. 12 and FIG. 13, the Multi-link Traffic Indication includes the Bitmap Size field, the Link ID Offset field, multiple Per-Link Traffic Indication Bitmap fields, the AID Offset field, and the like. As described above with reference to FIG. 13, one Multi-Link Traffic Indication Element may be allocated multiple combinations of the Bitmap Size field and the Link ID Offset field. Furthermore, as described above with reference to FIG. 14, the combination of the Link ID Offset field and the Bitmap Size field may be divided into multiple Information Elements for allocation.

2. Second Embodiment

The configurations of a radio communication system, an MLD access point apparatus, and an MLD station apparatus in a second embodiment are similar to those in the first embodiment, and may be combined with the first embodiment. As described below in the second embodiment with reference to FIG. 15, the Multi-link Traffic Indication Element includes a Bitmap Size field, a Link ID Block field, and multiple Per-Link Traffic Indication Bitmap fields. However, the Multi-link Traffic Indication Element may exclude any of the above-described fields or may include an AID offset field as another field. The usage method of the AID Offset is similar to that in the first embodiment. As described in the first embodiment with reference to FIG. 13, one Multi-Link Traffic Indication Element may be allocated multiple combinations of the Bitmap Size field and the Link ID Block field. Furthermore, as described in the first embodiment with reference to FIG. 14, the combination of the Bitmap Size field and the Link ID Block field may be divided into multiple Information Elements for allocation.

Figure 15:
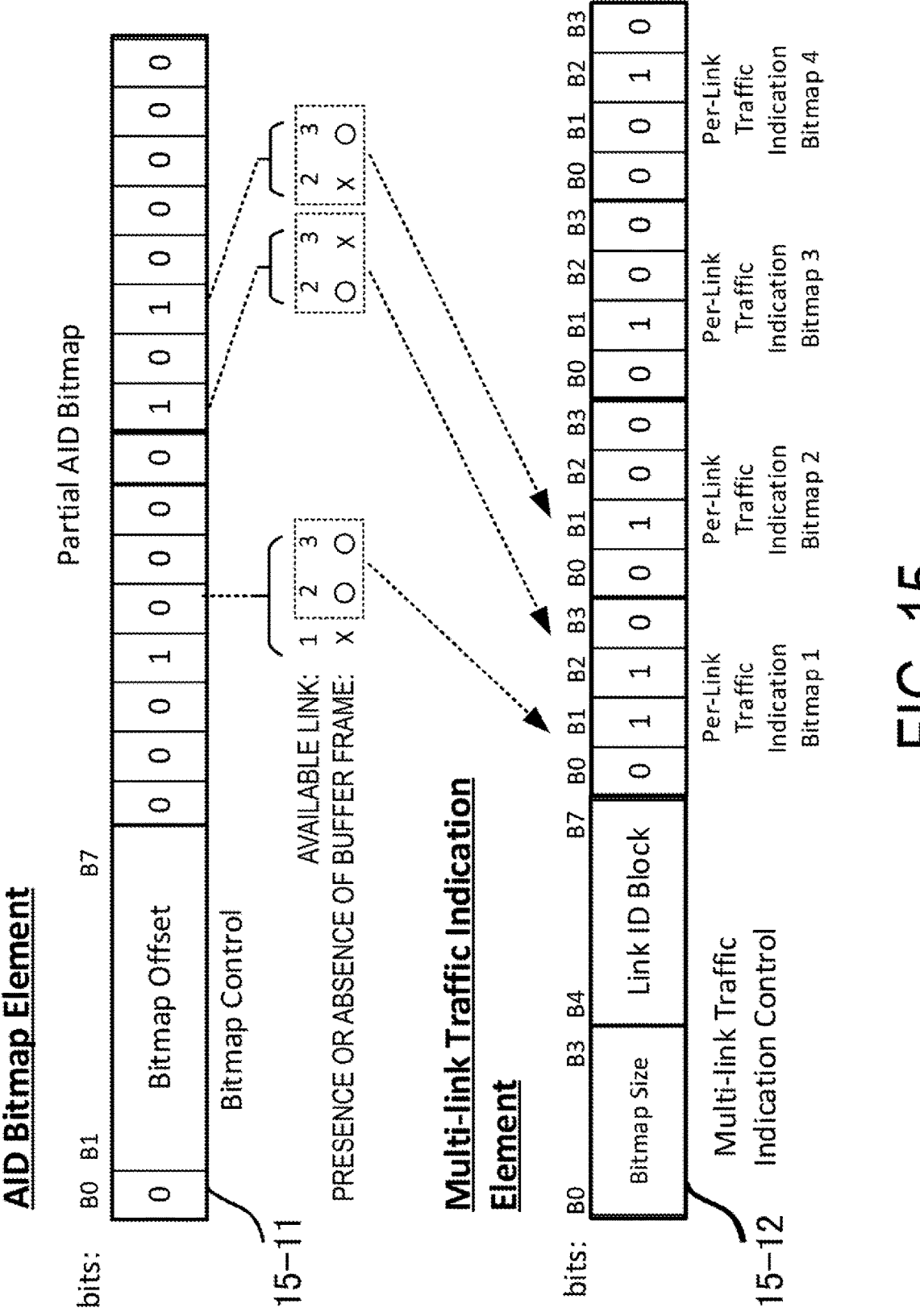
FIG. 15 is a diagram illustrating an example of a frame configuration according to an aspect of the present disclosure.

The Link ID Block will be described. For example, in a case that the MLD access point apparatus supports 16 links, i.e., the links 1 to 16, the total links are divided into four including a Link Block 1 of the links 1 to 4, a Link Block 2 of the links 5 to 8, a Link Block 3 of the links 9 to 12, and a Link Block 4 of the links 13 to 16. In FIG. 15, the Bitmap Offset of the AID Bitmap Element has a value of 0, and the Partial AID Bitmap is allocated 16 bits, thus allowing AID 1 to AID 16 to be represented. Here, each bit in the Partial AID Bitmap field (equivalent to the Partial Virtual Bitmap field) indicates whether a frame is buffered that is addressed to a respective one of the MLD station apparatuses corresponding to AID 1 to AID 16 in this order from the left. In this example, the bits at positions corresponding to AID 4, AID 9, and AID 11 are set, thus indicating that the MLD access point apparatus buffers frames addressed to the MLD station apparatuses corresponding to AID 4, AID 9, and AID 11.

The Multi-link Traffic Indication Element is used to indicate which link is indicated (recommended) for use to each MLD station apparatus by the MLD access point apparatus. The Multi-link Traffic Indication Element may include a Bitmap Size field, a Link ID Block field, and multiple Per-Link Traffic Indication Bitmap fields. The Multi-Link Traffic Indication Element may include an AID Bitmap Offset and a Link ID Offset, and is used as in the case of the first embodiment.

The Link ID Block field sets a value indicating a Link Block pointed to by each Per-Link Traffic Indication Bitmap. In this example, the Link ID Block field is assumed to set values indicating the Link Block 1 pointing to the links 1 to 4. In this case, four bits constituting each Per-Link Traffic Indication Bitmap respectively indicate the links 1 to 4. Given the Link ID Block field sets a value pointing to the Link Block 4 indicating the links 13 to 16, the four bits constituting each Per-Link Traffic Indication Bitmap respectively indicate the links 13 to 16.

In FIG. 15, the Per-Link Traffic Indication Bitmap 1 sets "0", "1", "1", and "0", indicating that the use of the link 2 and the link 3 is notified. The Per-Link Traffic Indication Bitmap 2 sets "0", "1", "0", and "0", indicating that the use of the link 2 is notified. The Per-Link Traffic Indication Bitmap 3 sets "0", "1", "0", and "0", indicating that the use of the link 2 is notified. The Per-Link Traffic Indication Bitmap 4 sets "0", "0", "1", and "0", indicating that the use of the link 3 is notified.

As described with reference to FIG. 15, the total number of 16 links are divided into four including the Link Block 1 of the links 1 to 4, the Link Block 2 of the links 5 to 8, the Link Block 3 of the links 9 to 12, and the Link Block 4 of the links 13 to 16. This is only an example. The total number of links may be varied according to the capability of the MLD access point apparatus, and the number of divisions is not limited to four but may be another value.

There is no limitation that the links are equally divided into four, and the links may be unequally divided into Link Blocks with different sizes, such as the Link Block 1 of the links 1 to 8, the Link Block 2 of links 9 to 12, the Link Block 3 of the links 13 to 15, and the Link Block 4 of the link 16.

Each link may be duplicated and included in different Link Blocks. For example, links 1 and 5 may be included in multiple Link Blocks. In this example, Link Block 1 may include links 1 to 8, Link Block 2 may include links 1, 5, and 9, Link Block 3 may include link 1 and links 10 to 12, and Link Block 4 may include links 13 to 16. Any link may be duplicated and included in the Link Blocks.

The link numbers included in each Link Block may be defined in a separately prepared table or defined in a MIB or the like.

Based on these assumptions, a more specific configuration of the Link Block will be described. The numbers of frequency bands and channels supported by Multi-Link are expected to increase in the future. At present, the main frequency bands are the 2.4 GHz band and the 5 GHz band, but in the future, the frequency band will increase to the 6 GHz band and further to the 45 GHz band and the 60 GHz band. The MLD station apparatuses may also be categorized (also referred to as graded or classified) according to the purpose of use, leading to a difference in the supported frequency band.

For example, 2.4 GHz is assumed to be prepared for the link 1, 5 GHz-1 is assumed to be prepared for the link 2, 5 GHz-2 is assumed to be prepared for the link 3, 6 GHz-1 is assumed to be prepared for the link 4, 6 GHz-2 is assumed to be prepared for the link 5, 45 GHz-1 is assumed to be prepared for the link 6, 45 GHz-2 is assumed to be prepared for the link 7, 45 GHz-3 is assumed to be prepared for the link 8, 45 GHz-4 is assumed to be prepared for the link 9, 60 GHz-1 is assumed to be prepared for the link 10, 60 GHz-2 is assumed to be prepared for the link 11, 60 GHz-3 is assumed to be prepared for the link 12, and 60 GHz-4 is assumed to be prepared for the link 13.

At a higher price (grade), more links may be supported, and a higher frequency band may be supported; an MLD station apparatus G1 in a low price range (low grade) may support the links 1 to 3 (supporting frequency bands 2.4 GHz and 5 GHz), an MLD station apparatus G2 corresponding to an upper model of the MLD station apparatus G1 may support the links 1 to 5 (supporting frequency bands 2.4 GHz, 5 GHz, and 6 GHz), an MLD station apparatus G3 corresponding to an upper model of the MLD station apparatus G2 may support the links 1 to 9 (supporting frequency bands 2.4 GHz, 5 GHz, and 45 GHz), and an MLD station apparatus G4 corresponding to an upper model of the MLD station apparatus G3 may support the links 1 to 13 (supporting frequency bands 2.4 GHz, 5 GHz, 6 GHz, 45 GHz, and 60 GHz).

The links are classified or categorized into the Link Block 1 of the links supported by the MLD station apparatus G1, the Link Block 2 of the links supported by the MLD station apparatus G2, the Link Block 3 of the links supported by the MLD station apparatus G3, and the Link Block 4 of the links supported by the MLD station apparatus G4. Separate Information Elements for notifying the presence or absence of a frame buffered by the MLD access point apparatus can be used for the respective categories (also referred to as for respective grades or for respective classes). With a large number of low-priced MLD station apparatuses G1 and a small number of high-priced MLD station apparatuses G4 connected to the MLD access point apparatus in a radio system, the number of bits included in the AID Bitmap Element and the Multi-Link Traffic Indication Element and consumed for the MLD station apparatus G1 can be reduced to a relatively small value without being affected by the MLD station apparatus G4 supporting a large number of links.

In the above description, the categorization (also referred to as grading, classification, or the like) is based on the price range or the like. However, such a concept of the Link Blocks is merely an example, and the criterion for the categorization is not limited to this. A category (also referred to as grade or class) number may be described in the Link ID Block field, and the link number corresponding to each category number may be defined in a table, the MIB, or the like.

3. Third Embodiment

Figure 16:
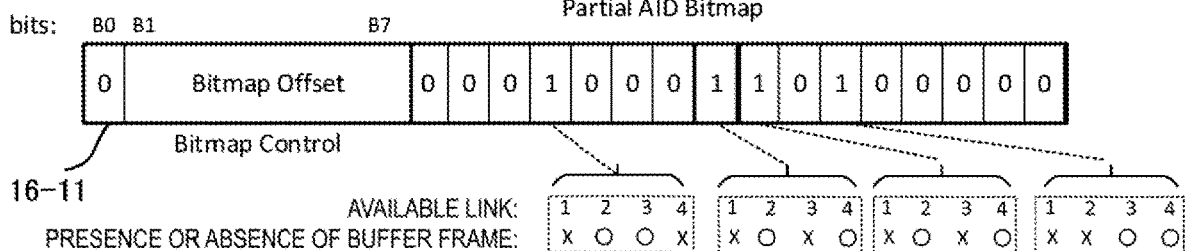
FIG. 16 is a diagram illustrating an example of a frame configuration according to an aspect of the present disclosure.
Figure 16:
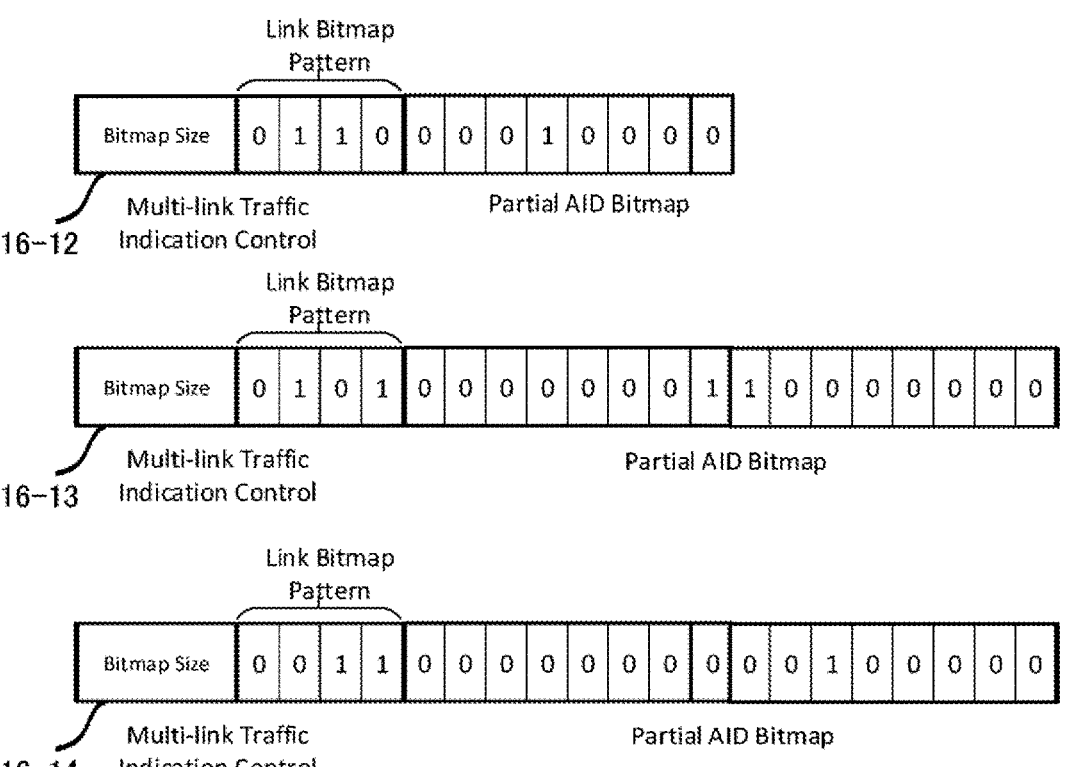

In a third embodiment, FIG. 16 is used to describe a method of using a Link Bitmap Pattern to notify which link is indicated (recommended) for use to each MLD station apparatus. In the present embodiment, the MLD access point apparatus notifies the MLD station apparatus of the link to be used by each MLD station apparatus by transmitting only the Multi-Link Traffic Indication Element to the MLD station apparatus, while not transmitting the AID Bitmap Element to the MLD station apparatus. Supplementally, the Multi-Link Traffic Indication Element contains information corresponding to the Partial AID Bitmap (equivalent to the Partial Virtual Bitmap) included in the AID Bitmap Element.

In this example, the Bitmap Offset of the AID Bitmap Element has a value of 0, and the Partial AID Bitmap is allocated 16 bits, thus allowing AID 1 to AID 16 to be represented. Each bit in the Partial AID Bitmap field indicates whether a frame is buffered that is addressed to a respective one of the station apparatuses corresponding to AID 1 to AID 16 in this order from the left. In this example, bits at positions corresponding to AID 4, AID 8, AID 9, and AID 11 are set, and thus the MLD access point apparatus buffers frames addressed to the MLD station apparatuses corresponding to AID 4, AID 8, AID 9, and AID 11.

The Multi-Link Traffic Indication Element in the present embodiment is a Variant based on the AID Bitmap Element. The Multi-Link Traffic Indication Element includes a Bitmap Size field, a Link Bitmap Pattern field, and a Partial AID Bitmap field. The Bitmap Size field in the present embodiment may indicate the size of the Link Bitmap Pattern field. The Multi-link Traffic Indication Element may exclude any of the above-described fields or may include an AID Bitmap Offset or a Link ID Offset as another field.

Here, the size of the Link Bitmap Pattern field is assumed to be indicated as "4", and in this case, targets to be represented by the Link Bitmap Pattern are the links 1 to 4. In a case that the use of the links 2 and 3 is indicated (or recommended) to the MLD station apparatus corresponding to AID 4, the Link Bitmap Pattern is represented as "0", "1", "1", and "0". In a case that the use of the links 2 and 4 is indicated (or recommended) to the MLD station apparatus corresponding to AID 8, the Link Bitmap Pattern is represented as "0", "1", "0", and "1". In a case that the use of the links 2 and 4 is indicated (or recommended) to the MLD station apparatus corresponding to AID 9, the Link Bitmap Pattern is represented as "0", "1", "0", and "1", as is the case with the Link Bitmap Pattern for AID 8 described above. In a case that the use of the links 3 and 4 is indicated (or recommended) to the MLD station apparatus corresponding to AID 11, the Link Bitmap Pattern is represented as "0", "0", "1", and "1".

A frame 16-12 is a Multi-Link Traffic Indication Element in which the Link Bitmap Pattern indicates "0", "1", "1", and "0". In this example, only AID 4 uses the Link Bitmap Pattern, and thus only the bits at positions corresponding to AID 4 are set in the Partial AID Bitmap.

A frame 16-13 is assumed to be a Multi-Link Traffic Indication Element in which the Link Bitmap Pattern indicates "0", "1", "0", and "1". In this example, AID 8 and AID 9 use the Link Bitmap Pattern, and thus only the bits at positions corresponding to AID 8 and AID 9 are set in the Partial AID Bitmap.

A frame 16-14 is assumed to be a Multi-Link Traffic Indication Element in which the Link Bitmap Pattern indicates "0", "0", "1", and "1". In this example, only AID 11 uses the Link Bitmap Pattern, and thus only the bits at positions corresponding to AID 11 are set in the Partial AID Bitmap.

As described above, the combination of the Link Bitmap Pattern and the Partial AID Bitmap can be used to notify which link is indicated (recommended) for use to each MLD station apparatus corresponding to the respective one of the AIDs.

As described above, the Multi-Link Traffic Indication Element may include the AID Bitmap Offset. In 16-14, the first byte of the Partial AID Bitmap indicates all 0s, and thus the AID Bitmap Offset may be set to "1" to remove the first byte of the Partial AID Bitmap from the Multi-Link Traffic Indication element.

As described above, the Multi-Link Traffic Indication Element may include the Link ID Offset. In the example of FIG. 16, the frame 16-12 does not indicate the use of the link 1 (or the recommendation for the use of the link 1), and thus with "1" indicated in the Link ID Offset and "3" indicated in the Bitmap Size field, the Link Bitmap Pattern may represent the links 2 to 4 as targets. In this case, the Link Bitmap Pattern for AID 4 can be represented as "1", "1", and "0", and the Link Bitmap Pattern for AID 8 and AID 9 can be represented as "1", "0", and "1". The frame 16-14 does not indicate the use of the links 1 and 2 (or the recommendation for the use of the links 1 and 2), and thus with "2" indicated in the Link ID Offset and "2" indicated in the Bitmap Size field, the Link Bitmap Pattern may represent the links 3 and 4 as targets. In this case, the Link Bitmap Pattern for AID 11 can be represented as "1" and "1".

As described above, AIDs having the same Link Bitmap Pattern can collectively be described in one Multi-Link Traffic Indication Element, and multiple Multi-Link Traffic Indication Elements with different Link Bitmap Patterns can be used to notify which link is indicated (recommended) for use to each MLD station apparatus. A combination of multiple Multi-Link Traffic Indication Elements may be used to notify all the links indicated (recommended) for use to each MLD station apparatus.

4. Fourth Embodiment

Figure 17:
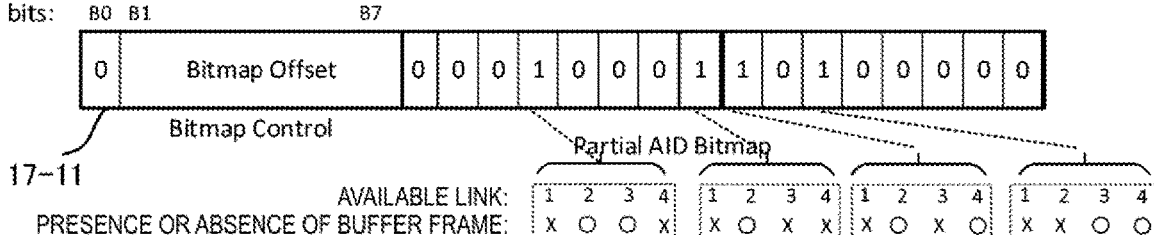
FIG. 17 is a diagram illustrating an example of a frame configuration according to an aspect of the present disclosure.
Figure 17:
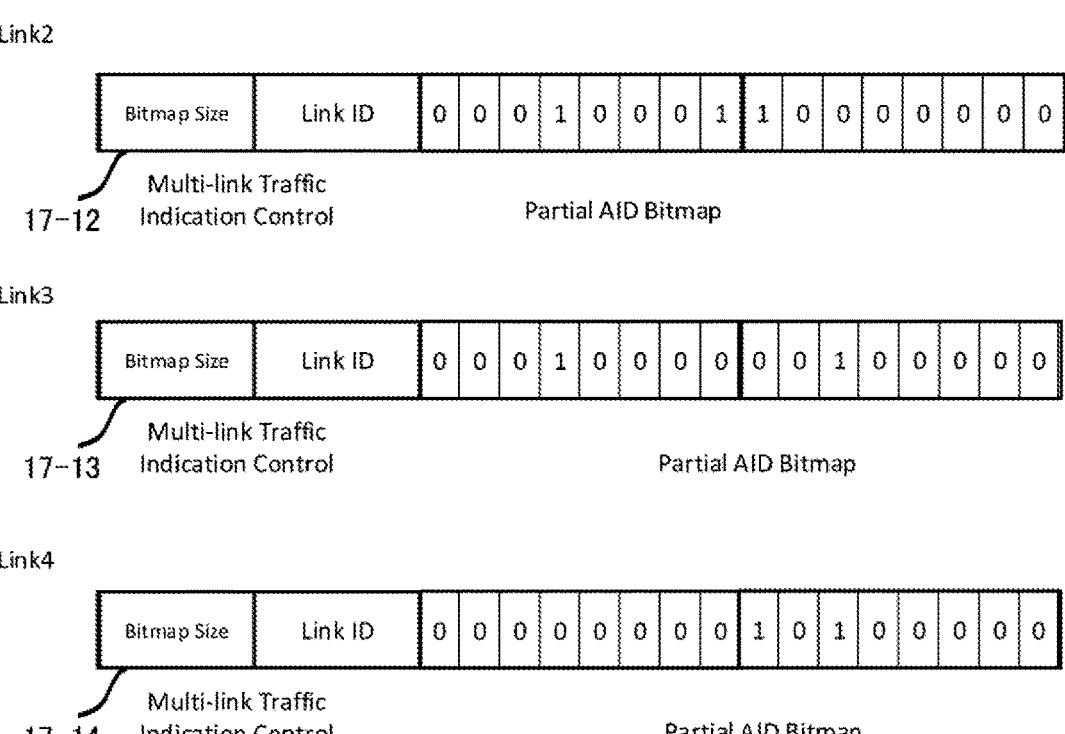

In a fourth embodiment, FIG. 17 is used to describe a technique in which the link number is used instead of the Link Bitmap pattern described in the third embodiment to notify which link is indicated (recommended) for use to each MLD station apparatus. Similarly to the third embodiment, in the present embodiment, the MLD access point apparatus notifies the link to be used by each MLD station apparatus by transmitting only the Multi-Link Traffic Indication Element to the MLD station apparatus, while not transmitting the AID Bitmap Element to the MLD station apparatus. Supplementally, the Multi-Link Traffic Indication Element contains information corresponding to the Partial AID Bitmap (equivalent to the Partial Virtual Bitmap) included in the AID Bitmap Element.

In this case, one Multi-Link Traffic Indication Element can be used to notify exclusively one of the links indicated (recommended) for use to each MLD station apparatus, and a combination of multiple Multi-Link Traffic Indication Elements can be used to notify all the links indicated (recommended) for use to each MLD station apparatus.

In this example, the Bitmap Offset of the AID Bitmap Element is assumed to have a value of 0, and the Partial AID Bitmap is allocated 16 bits, thus allowing AID 1 to AID 16 to be represented. Each bit in the Partial AID Bitmap field indicates whether a frame is buffered that is addressed to a respective one of the station apparatuses corresponding to AID 1 to AID 16 in this order from the left. In this example, bits at positions corresponding to AID 4, AID 8, AID 9, and AID 11 are set, and thus the MLD access point apparatus buffers frames addressed to the MLD station apparatuses corresponding to AID 4, AID 8, AID 9, and AID 11.

The Multi-Link Traffic Indication in the present embodiment includes a Bitmap Size field, a Link ID field, and a Partial AID Bitmap. The Multi-link Traffic Indication Element may exclude any of the above-described fields or may include an AID Bitmap Offset or a Link ID Offset as another field.

In a frame 17-12, the Link ID field is assumed to include a Multi-Link Traffic Indication Element indicating the link 2. In this example, the link 2 is indicated (or recommended) for use to AID 4, AID 8, and AID 9, and thus in the Partial AID Bitmap, only the bits at positions corresponding to AID 4, AID 8, and AID 9 are set.

In a frame 17-13, the Link ID field is assumed to include a Multi-Link Traffic Indication Element indicating the link 3. In this example, the link 3 is indicated (or recommended) for use to AID 4 and AID 11, and thus in the Partial AID Bitmap, only the bits at positions corresponding to AID 4 and AID 11 are set.

In a frame 17-14, the Link ID field is assumed to include a Multi-Link Traffic Indication Element indicating the link 4. In this example, the link 4 is indicated (or recommended) for use to AID 9 and AID 11, and thus in the Partial AID Bitmap, only the bits at positions corresponding to AID 9 and AID 11 are set.

As described above, the Link ID field can be used to notify which link is indicated (or recommended) for use to each MLD station apparatus corresponding to the respective one of the AIDs.

As described above, the Multi-Link Traffic Indication element may include the AID Bitmap Offset. In 17-14, the first byte of the Partial AID Bitmap indicates all Os, and thus the AID Bitmap Offset may be set to "1" to remove the first byte of the Partial AID Bitmap from the Multi-Link Traffic Indication Element.

As described above, AIDs having the same link number can collectively be described in one Multi-Link Traffic Indication Element, and multiple Multi-Link Traffic Indication Elements with different link numbers can be used to notify which link is indicated (recommended) for use to each MLD station apparatus.

5. Matters Common for all Embodiments

Although the communication apparatuses according to the present disclosure can perform communication in a frequency band (frequency spectrum) that is a so-called unlicensed band that does not require permission to use from a country or a region, available frequency bands are not limited thereto. The communication apparatus according to the present disclosure can exhibit its effect in a frequency band called a white band, which is actually not used for the purpose of preventing frequency jamming regardless of a nation or a region allowing utilization thereof for a specific service (for example, a frequency band allocated for television broadcasting or a frequency band which is not used depending on regions), or a shared spectrum (shared frequency band) which is expected to be shared by a plurality of service providers, for example.

A program that operates in the radio communication apparatus according to the present disclosure is a program (a program for causing a computer to function) for controlling the CPU or the like to implement the functions of the aforementioned embodiments related to the present disclosure. In addition, information handled by these apparatuses is temporarily accumulated in a RAM at the time of processing, is then stored in various types of ROMs and HDDs, and is read by the CPU as necessary to be corrected and written. A semiconductor medium (e.g., a ROM, a non-volatile memory card, etc.), an optical recording medium (e.g., a DVD, an MO, an MD, a CD, a BD, etc.), a magnetic recording medium (e.g., a magnetic tape, a flexible disk, etc.), and the like can be examples of recording media for storing programs. In addition to implementing the functions of the aforementioned embodiments by performing loaded programs, the functions of the present disclosure are implemented in processing performed in cooperation of an operating system, other application programs, and the like based on instructions of those programs.

In a case of delivering these programs to market, the programs can be stored and distributed in a portable recording medium, or transferred to a server computer connected via a network such as the Internet. In this case, the storage device serving as the server computer is also included in the present disclosure. In addition, a part or an entirety of the communication apparatuses in the aforementioned embodiments may be implemented as an LSI that is typically an integrated circuit. The functional blocks of the communication apparatuses may be individually implemented as chips or may be partially or completely integrated into a chip. In a case that the functional blocks are made as integrated circuits, an integrated circuit controller for controlling them is added.

In addition, the circuit integration technique is not limited to LSI, and may be realized as dedicated circuits or a multi-purpose processor. Moreover, in a case that a circuit integration technology that substitutes an LSI appears with the advance of the semiconductor technology, it is also possible to use an integrated circuit based on the technology.

Note that, the invention of the present application is not limited to the above-described embodiments. The radio communication apparatus according to the invention of the present application is not limited to the application in the mobile station apparatus, and, needless to say, can be applied to a fixed-type electronic apparatus installed indoors or outdoors, or a stationary-type electronic apparatus, for example, an AV apparatus, a kitchen apparatus, a cleaning or washing machine, an air-conditioning apparatus, office equipment, a vending machine, and other household apparatuses.

Although the embodiments of the invention have been described in detail above with reference to the drawings, a specific configuration is not limited to the embodiments, and designs and the like that do not depart from the essential spirit of the invention also fall within the claims.

INDUSTRIAL APPLICABILITY

The present disclosure can be preferably used in a communication apparatus and a communication method.

REFERENCE SIGNS LIST

1-1, 1-2 (MLD) access point apparatus
2-1 to 2-6 (MLD) station apparatus
3-1, 3-2 Radio communication system
10000-1 Radio communication apparatus
10001-1 Higher layer processing unit
10001*a*-1 Multi-link controller
10002-1 Controller
10002*a*-1 CCA part
10002*b*-1 Backoff part
10002*c*-1 Transmission determination part
10003-1 Transmitter
10003*a*-1 Physical layer frame generator
10003*b*-1 Wireless transmitter
10004-1 Receiver 10004*a*-1 Wireless receiver
10004*b*-1 Signal demodulator
10004*c*-1 Reception quality measuring unit
10005-1 Antenna
20000-1 MLD access point apparatus
20000-2, 20000-3, 20000-4 Sub radio communication
    apparatus (sub access point apparatus)
30000-1 MLD station apparatus
30000-2, 30000-3, 30000-4 Sub radio communication
    apparatus (sub station apparatus)
10-1 Multi-link establishment request
10-2 Multi-link establishment response
10-4, 10-5, 10-6 Management frame
10-7 Control frame
10-8 Frame
12-11 12-12 13-11 13-12 14-11 14-12 14-21 14-22 15-11
    15-12 16-11 16-12 16-13 16-14 17-11 17-12 17-13
    17-14 Frame configuration
14-1, 14-2 Frame combination
The invention claimed is:

1. An access point apparatus for communicating with a station apparatus, the access point apparatus comprising:

one or more transmitting circuitries and one or more receiving circuitries configured to communicate with the station apparatus by using multiple links, each of the one or more transmitting circuitries and each of the one or more receiving circuitries corresponding to respective ones of the multiple links, wherein:

any of the one or more transmitting circuitries transmits, to the station apparatus, a frame including a multi-link traffic indication element, the multi-link traffic indication element including a plurality of pieces of first information, each of the plurality of pieces of first information is associated with a respective one of a plurality of frequency bands, each frequency band in the plurality of frequency bands being different from other frequency bands in the plurality of frequency bands, and each of the plurality of pieces of first information comprises:

a respective piece of traffic indication bitmap information, a respective piece of size information for the respective piece of traffic indication bitmap information, and a respective piece of link information for the respective piece of traffic indication bitmap information.

2. The access point apparatus according to claim 1, wherein the respective piece of link information indicates whether links, as targets for the respective piece of traffic indication bitmap information, includes millimeter waves and/or micrometer waves.

3. The access point apparatus according to claim 1, wherein the frame includes a respective piece of traffic indication bitmap information for links including millimeter waves in addition to a respective piece of traffic indication bitmap information for links including micrometer waves.

4. A station apparatus for communicating with an access point apparatus, the station apparatus comprising:

one or more transmitting circuitries and one or more receiving circuitries configured to communicate with the access point apparatus by using multiple links, each of the one or more transmitting circuitries and each of the one or more receiving circuitries corresponding to respective ones of the multiple links, wherein;

any of the one or more receiving circuitries receives, from the access point apparatus, a frame including a multi-link traffic indication element, the multi-link traffic indication element including a plurality of pieces of first information, each of the plurality of pieces of first information is associated with a respective one of a plurality of frequency bands, each frequency band in the plurality of frequency bands being different from other frequency bands in the plurality of frequency bands, and each of the plurality of pieces of first information comprises:

a respective piece of traffic indication bitmap information, a respective piece of size information for the respective piece of traffic indication bitmap information, and a respective piece of link information for the respective piece of traffic indication bitmap information.

5. The station apparatus according to claim 4, wherein the respective piece of link information indicates whether links, as targets for the respective piece of traffic indication bitmap information, includes millimeter waves and/or micrometer waves.

6. The station apparatus according to claim 4, wherein the frame includes a respective piece of traffic indication bitmap information for links including millimeter waves in addition to a respective piece of traffic indication bitmap information for links including micrometer waves.

7. A method performed by an access point apparatus for communicating with a station apparatus, the method comprising:

communicating with the station apparatus by using multiple links; and transmitting, to the station apparatus, a frame including a multi-link traffic indication element, the multi-link traffic indication element including a plurality of pieces of first information, wherein:

each of the plurality of pieces of first information is associated with a respective one of a plurality of frequency bands, each frequency band in the plurality of frequency bands being different from other frequency bands in the plurality of frequency bands, and each of the plurality of pieces of first information comprises:

a respective piece of traffic indication bitmap information, a respective piece of size information for the respective piece of traffic indication bitmap information, and a respective piece of link information for the respective piece of traffic indication bitmap information.

8. The method according to claim 7, wherein the respective piece of link information indicates whether links, as targets for the respective piece of traffic indication bitmap information, includes millimeter waves and/or micrometer waves.

9. The method according to claim 7, wherein the frame includes a respective piece of traffic indication bitmap information for links including millimeter waves in addition to a respective piece of traffic indication bitmap information for links including micrometer waves.

* * * * *